(12) United States Patent
Hanada et al.

(10) Patent No.: US 7,154,973 B2
(45) Date of Patent: Dec. 26, 2006

(54) SPREADING CODE SYNCHRONIZATION METHOD, RECEIVER, AND MOBILE STATION

(75) Inventors: Yukiko Hanada, Yokohama (JP); Kenichi Higuchi, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 842 days.

(21) Appl. No.: 09/981,988

(22) Filed: Oct. 19, 2001

(65) Prior Publication Data

US 2002/0048315 A1    Apr. 25, 2002

(30) Foreign Application Priority Data

Oct. 19, 2000    (JP)    ............................. 2000-319937

(51) Int. Cl.
*H04L 7/00*    (2006.01)
*H04Q 7/20*    (2006.01)

(52) U.S. Cl. ........................ 375/354; 375/149; 455/436

(58) Field of Classification Search ................ 375/356, 375/354, 357, 368; 455/436, 437, 442, 458
See application file for complete search history.

(56) References Cited

U.S. PATENT DOCUMENTS

| | | | |
|---|---|---|---|
| 6,597,674 B1 * | 7/2003 | Obuchi et al. ............... | 370/331 |
| 6,697,622 B1 * | 2/2004 | Ishikawa et al. ............ | 455/434 |
| 2002/0142776 A1 * | 10/2002 | Tiedemann, Jr. ............ | 455/450 |

FOREIGN PATENT DOCUMENTS

| EP | 0 825 737 | 2/1998 |
|---|---|---|
| JP | 11-196460 | 7/1999 |

OTHER PUBLICATIONS

ETSI Technical Report, XP-002109765, pp. 47-48, "UMTS Terrestrial Radio Access Concept Evaluacion", Dec. 1997.
Y. Hanada, et al., IEICE Trans. Commun., vol. E83-B, No. 8, XP-000987025, pp. 1610-1618, "Fast Cell Search Algorithm in Idle Mode for Inter-Cell Asynchronous W-CDMA Mobile Radio", Aug. 2000.
E. Dahlman, et al., IEEE Communications Magazine, vol. 36, No. 9, XP-000784828, pp. 70-80, "UMTS/IMT-2000 Based on Wideband CDMA", Sep. 1, 1998.

* cited by examiner

*Primary Examiner*—Kevin Kim
(74) *Attorney, Agent, or Firm*—Oblon, Spivak, McClelland, Maier & Neustadt, P.C.

(57) ABSTRACT

The present invention relates to a spreading code synchronization method and others for implementing fast cell search during entry of a mobile station into a soft handover mode in an intercell asynchronous system. In the spreading code synchronization method according to the present invention, a correlation is first detected between a received signal and a common short code, and a received timing of a scrambling code mask of a handover destination cell is detected based thereon. At this time, in order to avoid reception of a signal transmitted from a connecting cell, a received timing of a mask symbol from the connecting cell is excepted from a search range for the received timing of the scrambling code mask of the handover destination cell. The spreading code synchronization method further includes steps of detecting for each of scrambling code candidates a correlation between the received signal and a code of a product of a scrambling code and a common short code at the received timing of the scrambling code mask of the handover destination cell detected, and identifying the scrambling code of the signal transmitted from the handover destination cell, from magnitudes of correlation values.

11 Claims, 25 Drawing Sheets

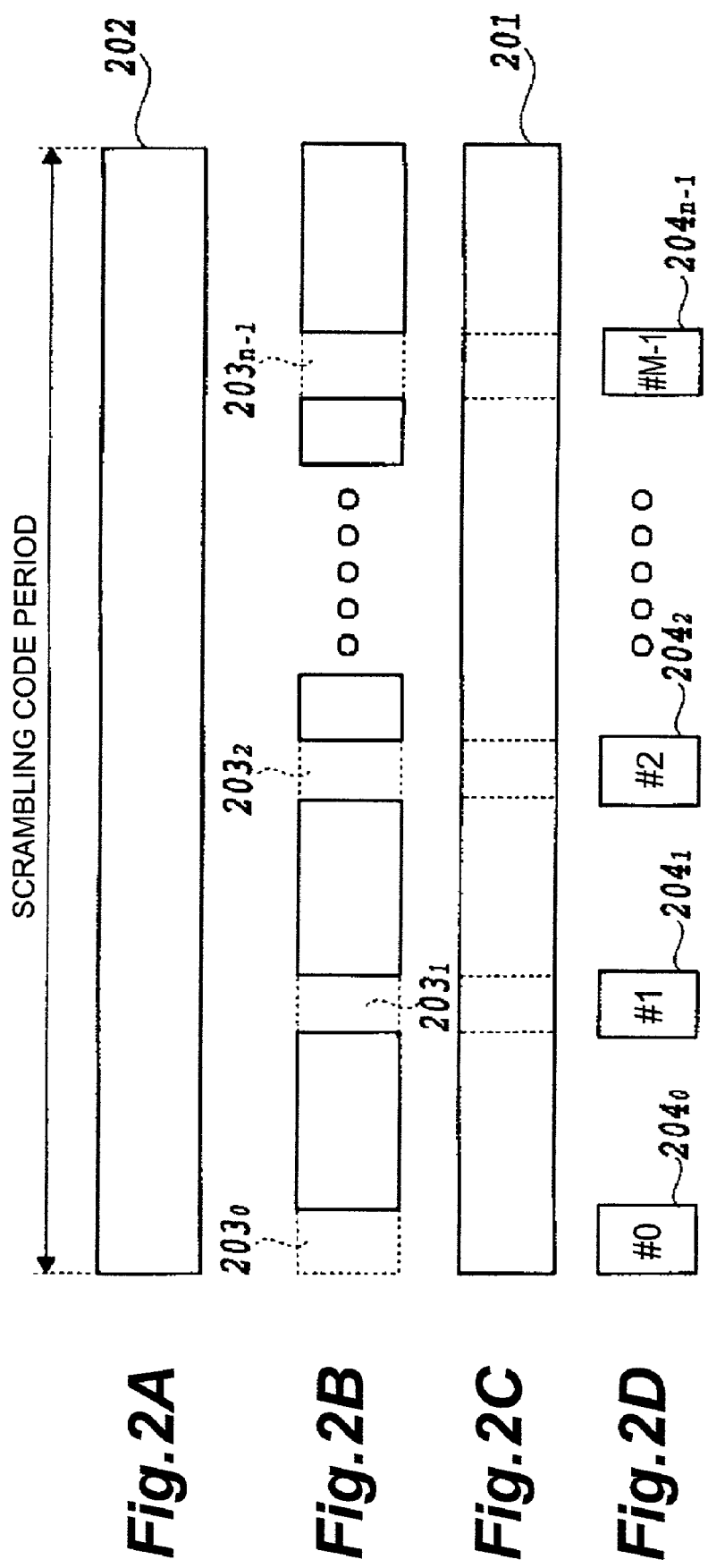

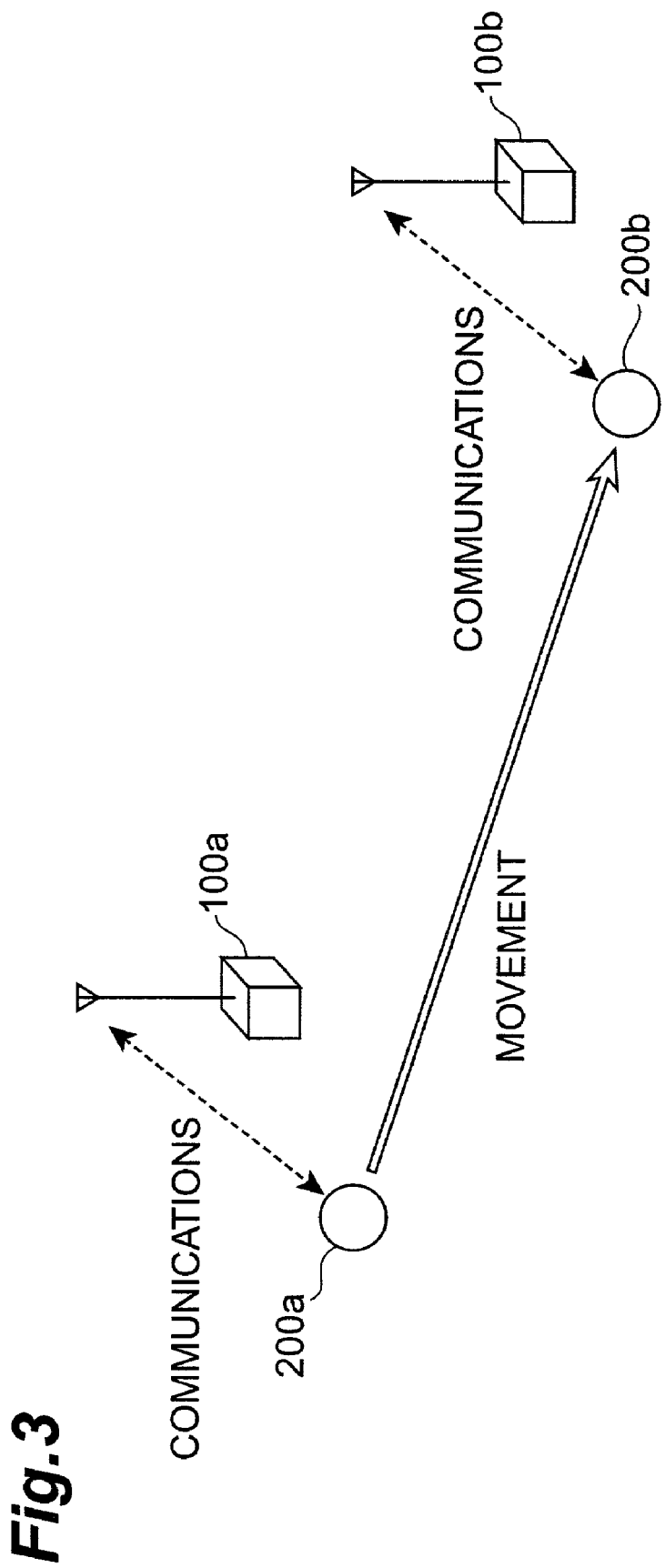

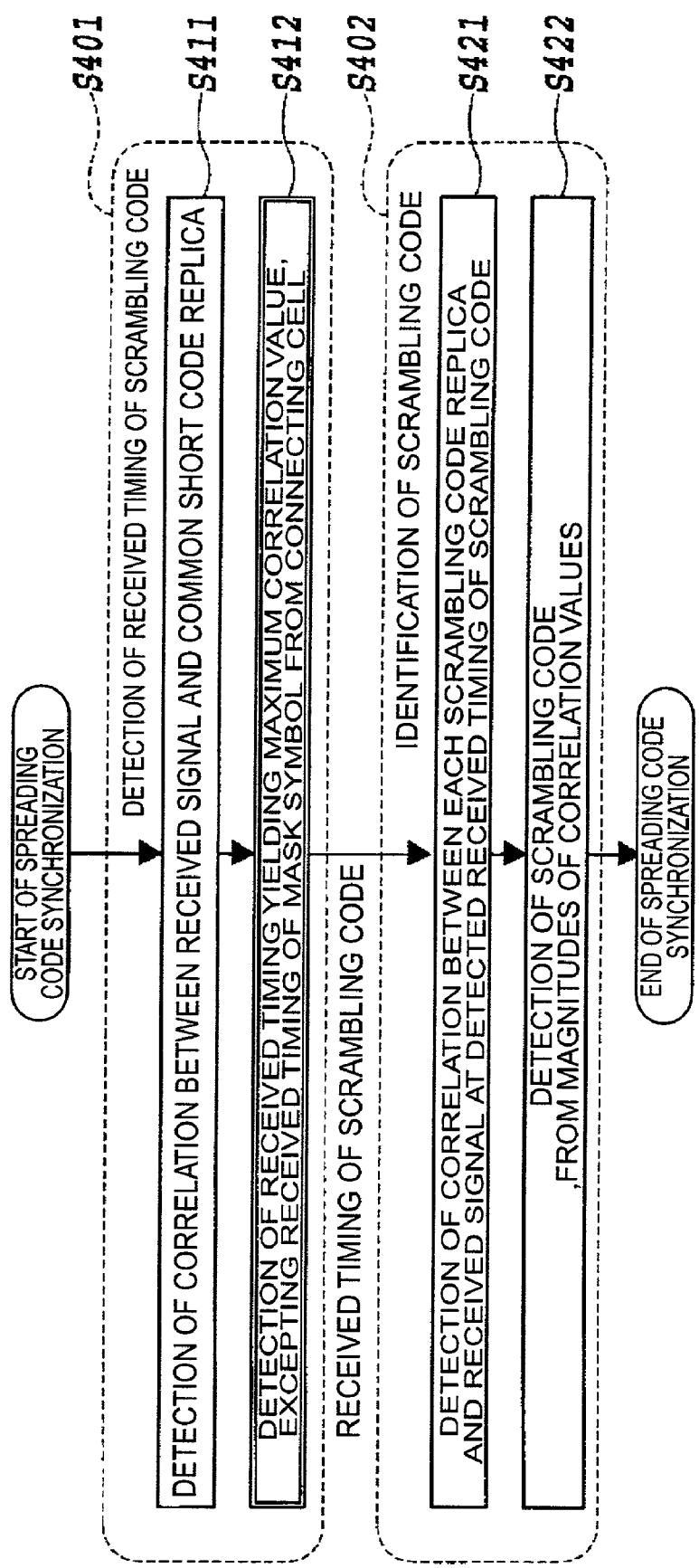

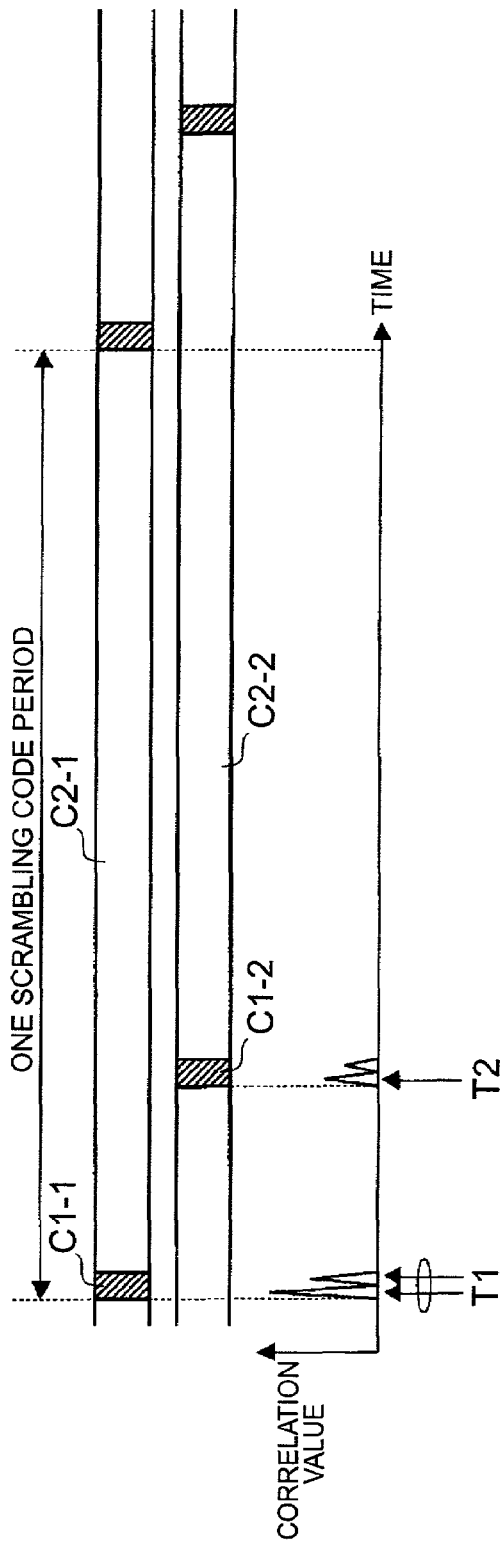
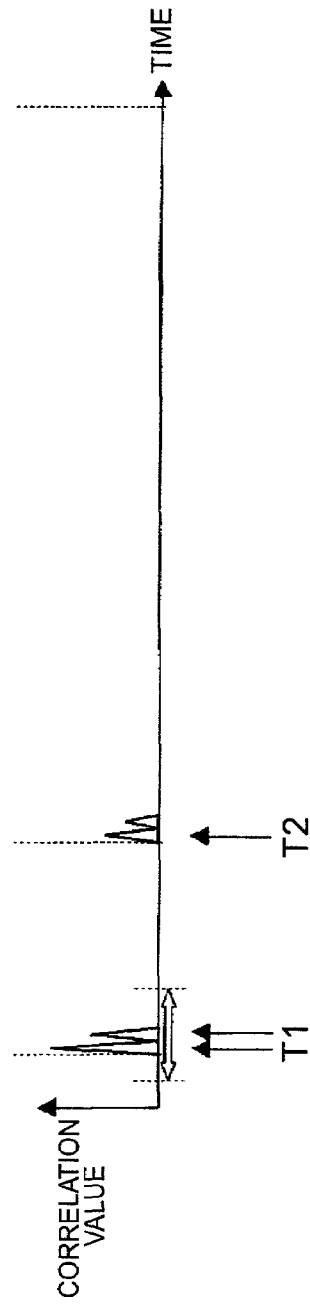
Fig.7A Fig.7B Fig.7C Fig.7D

SPREADING CODE SYNCHRONIZATION METHOD, RECEIVER, AND MOBILE STATION

BACKGROUND OF THE INVENTION

1. Field of the Invention

The present invention relates to a spreading code synchronization method and others in mobile communication systems employing the direct sequence code division multiple access scheme for multiple access through use of spectrum spreading.

2. Related Background Art

The direct sequence code division multiple access (DS-CDMA) scheme enables a plurality of users to perform communications in an identical frequency band by transmission based on secondary modulation to spread the conventional information data modulated signal by a fast rate spreading code. Each user is identified by identifying a spreading code assigned to every user. For this reason, the receiver side needs to restore the received input signal of wide band to the original signal of narrow band in a despreading process, prior to execution of the conventional demodulation process. In the despreading process on the receiver side, correlation detection is carried out to detect correlation between the received signal and a spreading code replica synchronized in phase with a spreading code of the received signal. Particularly, an action to establish the phase synchronization between the spreading code replica of the receiver and the spreading code of the received signal at a start of communications, is called initial acquisition.

A common initial acquisition method of spreading code is a method of multiplying the received signal by the spreading code replica and integrating the resultant product over a predetermined time period, thereby determining a correlation between the two signals. In this initial acquisition method the resultant correlation output is then subjected to the square-law detection and whether or not synchronization is established is judged by determining whether or not the result of the square-law detection exceeds a threshold value. The correlation detection is generally classified under a case utilizing a sliding correlator to perform time integral and a case utilizing a matched filter has a function to perform space integral. The matched filter has a function equivalent to a plurality of sliding correlators arranged in parallel, in which the spreading code replica of each top is varied in accordance with the spreading code whereby correlation values over plural chips can be gained instantaneously. Accordingly, the matched filter operates very fast on one hand, but has large circuit scale and power consumption on the other hand, as compared with the sliding correlator.

The wideband DS-CDMA with the spreading band of not less than 5 MHz (hereinafter referred to as W-CDMA) is now under full commercial service. This W-CDMA is an asynchronous system where base stations operate based on independent time references. FIG. 1A is a diagram to show an example of assignment of spreading codes in the downlink in of an intercell synchronous system as a mobile communication system and FIG. 1B a diagram to show an example of assignment of spreading codes in the downlink in an intercell asynchronous system as a mobile communication system.

The cdma2000 scheme and the IS-95 scheme, which were proposed as candidates for IMT-2000 in the United States as the W-CDMA was, implement synchronization between base stations, using the GPS (Global Positioning System). In this intercell synchronous system (FIG. 1A), all the base stations have a common time reference. For this reason, the base stations can share a common spreading code with different delays for the respective stations. This intercell synchronous system can achieve the initial acquisition by performing synchronization of timing of the spread code.

In the intercell asynchronous system shown in FIG. 1B, the base stations have no common time reference and thus each base station is identified by a scrambling code. When a mobile station is powered up, it needs to establish synchronization with a scrambling code of a common control channel from a cell site to connect with a base station with the largest power of received signal (which will be called a cell or a cell site). This synchronizing method is called cell search in a sense of searching for a cell site for connection of a radio channel. In the intercell asynchronous system, the mobile station has to perform the cell search throughout all the scrambling codes determined in the system.

The known techniques of speeding up the cell search in the intercell asynchronous system include, for example, the spreading code synchronization methods described in EP 0825737 A1 and Japanese Patent Application Laid-Open No. H11-196460.

FIGS. 2A to 2D are diagrams to show an example of a transmitted signal in the cell search using mask symbols, wherein FIG. 2A shows a scrambling code before masked, FIG. 2B a masked scrambling code, FIG. 2C a common short code, and FIG. 2D a scrambling code group identification (ID) code. A channel with which a mobile station connects (radio-links) at the beginning of communications, is referred to as a perch channel. The perch channel is spread by the combination of the common short code 201 whose cycle period is a symbol period and which is common to all the base stations and the scrambling code 202 which is different among the base stations. Then the scrambling code is masked in a fixed period to produce symbols $203_1$ to $203_{M-1}$ spread by only the common short code 201. The common short code 201 is common to the base stations and the mobile station detects correlation values by means of the matched filter, using the common short code 201 as a spreading code replica. The mobile station can detect peaks at received timings of the signal spread by only the short code, regardless of the scrambling code 202. Timing synchronization of the scrambling code 202 is established by storing the received timings.

Further, scrambling codes 202 are preliminarily grouped. As receiving the scrambling code group ID code $204_1$ to $204_{M-1}$ representing a belonging group, the mobile station detects the scrambling code group ID code $204_1$ to $204_{M-1}$ representing the group, subsequent to the detection of the common short code. This can decrease the number of candidates of scrambling codes 202 to be searched. The scrambling code 202 assigned to each base station can be identified by detecting correlations at the received timings already obtained, using the product of the common short code 201 and the scrambling code 202 as a replica code, and performing the judgment with a threshold. By the three-step fast cell search method utilizing the scrambling code mask in this way, fast cell search is also implemented in the intercell asynchronous system.

The above-described three-step fast cell search method is modified as follows in the process of standardization of 3GPP (Third Generation Partnership Project). The common short code and the mask symbols spread by the short code and indicating the scrambling code group, are defined as Primary Synchronization Channel (PSCH) and Secondary Synchronization Channel (SSCH) independent of the perch channel, and the channel used for the identification of the scrambling code is also changed from the perch channel to a common pilot channel. The common short code is defined as PSC (Primary Synchronization Code), and the scrambling code group ID code as SSC (Secondary Synchronization Code).

SUMMARY OF THE INVENTION

The inventors have researched the spreading code synchronization methods in the conventional mobile communication systems, particularly, in the intercell asynchronous systems, and found the following problem. In the conventional mobile communication systems, since the mobile station moves during communications, it becomes necessary for the mobile station to change the cell site with the largest receiving power, i.e., the cell site to radio-link during communications. For this handover of cell site (which will be referred to hereinafter as soft handover), the mobile station (the receiver side) also needs to establish the synchronization of the spreading code of the perch channel on a periodical basis for cell sites surrounding the currently connecting cell site, and measure reception levels thereof. The conventional cell search methods, when applied as they were, had the problem that the received signal from the connecting cell caused interference so as to disable the detection of surrounding cell sites.

The present invention has been accomplished in order to solve the problem as described above and it is an object of the invention to provide a spreading code synchronization method for implementing fast cell search during entry of the mobile station into a soft handover mode in the mobile communication systems, particularly, in the intercell asynchronous systems; receiver for realizing the spreading code synchronization method; and a mobile station provided with the receiver as part of communication means.

A spreading code synchronization method according to the present invention is applied to a mobile communication system in which a mobile station performs communications while changing over among communication cells (base stations) according to its own movement, particularly, to an intercell asynchronous system. In the spreading code synchronization method, on the occasion of handover (changeover) from at least one first base station under communications with the mobile station to a second base station expected to initiate new communications in the mobile communication system, synchronous detection is carried out to detect a second spreading code assigned to the second base station, out of signals which are received each by the mobile station and each of which comprises an information data symbol spread by a combination of a first spreading code and a second spreading code, and a mask symbol spread by only the first spreading code. The foregoing mobile station encompasses portable information devices such as mobile telephones, computers, electronic notes, and the like, and also encompasses automobiles, bicycles, motorcycles, trains, airplanes, ships, etc. equipped with communication means.

Particularly, the spreading code synchronization method according to the present invention comprises a first step of detecting a received timing of a mask symbol from the second base station in a state in which a received timing of a mask symbol from the first base station is excepted from candidates of received timings for the synchronous detection; and a second step of carrying out the synchronous detection of the second spreading code assigned to the second base station.

This configuration permits a timing of a scrambling code mask of a signal received from a handover destination (equivalent to the foregoing second base station expected to initiate new communications) to be detected without detecting the timing of the scrambling code mask from the currently connecting cell equivalent to the foregoing first base station under communications with the mobile station, which enables faster detection of the cell of the handover destination.

In the spreading code synchronization method according to the present invention, the second step may be a step of carrying out the synchronous detection, using only an arbitrary number of second spreading codes informed by the first base station, as candidates. Namely, since in the mobile communication system the second spreading codes assigned to each base station and to base stations located around it are known, the system may be configured so that the base station under communications notifies the mobile station of the second spreading codes assigned to the surrounding base stations to be subjected to cell search. In this case, the mobile station does not have to detect correlations between all the scrambling codes prepared in the mobile communication system and signals received by the mobile station and it is sufficient for the mobile station to detect correlations with only the informed scrambling codes, which can largely decrease the time necessary for identification.

Further, the spreading code synchronization method according to the present invention may comprise a third step carried out between the first and second steps. This third step is a step of detecting a second spreading code group, using as candidates only groups including the arbitrary number of second spreading codes informed by the first base station (second spreading codes assigned to respective base stations located around the first base station). In this case, the second step is preferably configured to perform the synchronous detection, using as candidates only the arbitrary number of second spreading codes informed by the first base station, out of the second spreading codes included in the second spreading code group detected in the third step. The reason is that for detection of a scrambling code group to which the handover destination cell belongs, there is no need for determining correlations with all the group ID codes and it is sufficient to determine correlations with only the group ID codes to which the informed scrambling codes belong (normally, about 20 codes). On the occasion of identifying the scrambling code of the handover destination cell, there is no need for determining the correlations with all the scrambling codes prepared in the mobile communication system, but it is sufficient to determine the correlations with only the informed scrambling codes, which can largely decrease the time necessary for the identification.

After the first and second steps, or the first to third steps are repeated either for a predetermined time or a predetermined number of times, and when the received timing of the mask symbol from the second base station is not detected, it is preferable to perform detection of the received timing of the mask symbol from the second base station, using received timings of all the scrambling codes as candidates without exception. The reason is that, even if the received timing of the scrambling code mask from the connecting cell coincides with the received timing of the scrambling code mask of the handover destination cell, the received timing of the scrambling code mask of the handover destination cell can be detected and it thus becomes feasible to detect the cell of the handover destination.

A receiver according to the present invention comprises, as a configuration for implementing the above-stated spreading code synchronization method (the spreading code synchronization method according to the present invention), first means for detecting a received timing of a mask symbol from a second base station in a state in which a received timing of a mask symbol from a first base station is excepted from candidates of received timings for synchronous detection; and second means for performing the synchronous detection of a second spreading code assigned to the second base station. Particularly, the receiver constitutes part of communication means of the mobile station in the mobile communication system. Specifically, the receiver constitutes part of the communication means included in the mobile information devices such as the mobile telephones, computers, electronic notes, and so on, or part of the communication means provided in the automobiles, bicycles, motorcycles, trains, airplanes, ships, and so on. This structure permits the timing of the scrambling code mask of the signal sent from the cell of the handover destination to be detected without detecting the timing of the scrambling code mask from the connecting cell, and it thus becomes feasible to detect the cell of the handover destination.

The second means may also be configured to perform the synchronous detection, using as candidates only an arbitrary number of second spreading codes informed by the first base station. Namely, since in the mobile communication system the second spreading codes assigned to each base station and to base stations located around it are known, the system may be configured so that the base station under communications notifies the mobile station of the second spreading codes assigned to the surrounding base stations to be subjected to cell search. There is no need for detection of correlations between all the scrambling codes prepared in the mobile communication system and signals received by the receiver, but it is sufficient to determine correlations with only the informed scrambling codes, which can largely decrease the time necessary for identification.

Further, the receiver according to the present invention may comprise third means for detecting a second spreading code group, using as candidates only groups including the arbitrary number of second spreading codes informed by the first base station (the second spreading codes assigned to the respective base stations located around the first base station). In this case, the second means is preferably configured to perform the synchronous detection, using as candidates only the arbitrary number of second spreading codes informed by the first base station, out of the second spreading codes included in the second spreading code group detected by the third means. The reason is that for detection of the scrambling code group of the handover destination cell, there is no need for detection of correlations with all the scrambling code group ID codes but it is sufficient to determine correlations with the group ID codes to which the informed scrambling codes belong (normally, about 20 codes). In addition, on the occasion of identifying the scrambling code of the handover destination cell, there is no need for detection of correlations with all the scrambling codes prepared in the mobile communication system, but it is sufficient to determine correlations with only the informed scrambling codes, which can largely decrease the time necessary for the identification.

After the synchronous detection of the second spreading code by the first and second means or by the first to third means is repeated either for a predetermined time or a predetermined number of times, and when the received timing of the mask symbol from the second base station is not detected, it is preferable to carry out the detection of the received timing of the mask symbol from the second base station, using received timings of all the scrambling codes as candidates without exception. The reason is that, even if the received timing of the scrambling code mask from the connecting cell coincides with the received timing of the scrambling code mask of the handover destination cell, the received timing of the scrambling code mask of the handover destination cell can be detected and it thus becomes feasible to detect the cell of the handover destination.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 2A to 2D are diagrams to show an example of transmitted signal in the cell search using mask symbols;

FIG. 3 is a diagram to show a schematic configuration of a mobile communication system to which the spreading code synchronization method according to the present invention is applied;

FIG. 6 is a flowchart for explaining the operation of the first embodiment of the spreading code synchronization method according to the present invention;

FIGS. 7A to 7D are diagrams for explaining an example of a method of excepting the received timing of the mask symbol from the connecting base station;

DETAILED DESCRIPTION OF THE PREFERRED EMBODIMENTS

Each of embodiments of the spreading code synchronization method and others according to the present invention will be described below with reference to FIGS. 3 to 6, 7A to 7D, and 8 to 25. Throughout the description of the drawings the same portions and the same members will be denoted by the same reference symbols and redundant description will be omitted.

The spreading code synchronization method according to the present invention is carried out in the mobile communication system as shown in FIG. 3, including a structure for implementing faster soft handover (fast cell research) from a currently connecting base station 100a (connecting cell) to another base station 100b (a cell expected to initiate new communications) while a mobile station 200a moves (a mobile station 200b corresponds to the mobile station 200a had moved along the arrow in FIG. 3).

Figure 1A:
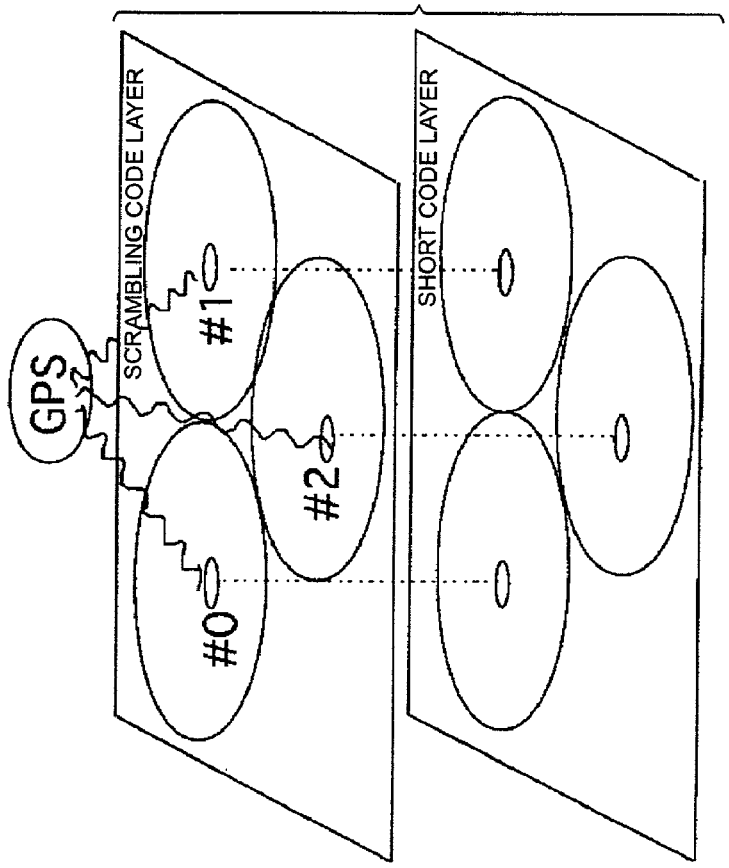
FIG. 1A is a diagram to show an example of assignment of spreading codes in the downlink of an intercell synchronous system, and FIG. 1B a diagram to show an example of assignment of spreading codes in the downlink of an asynchronous system.
Figure 1B:
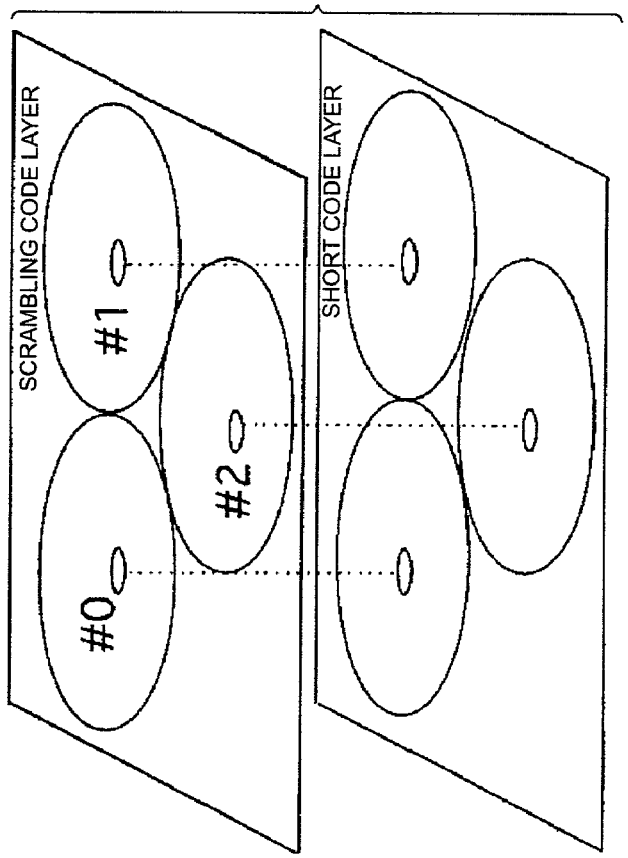
Figure 4:
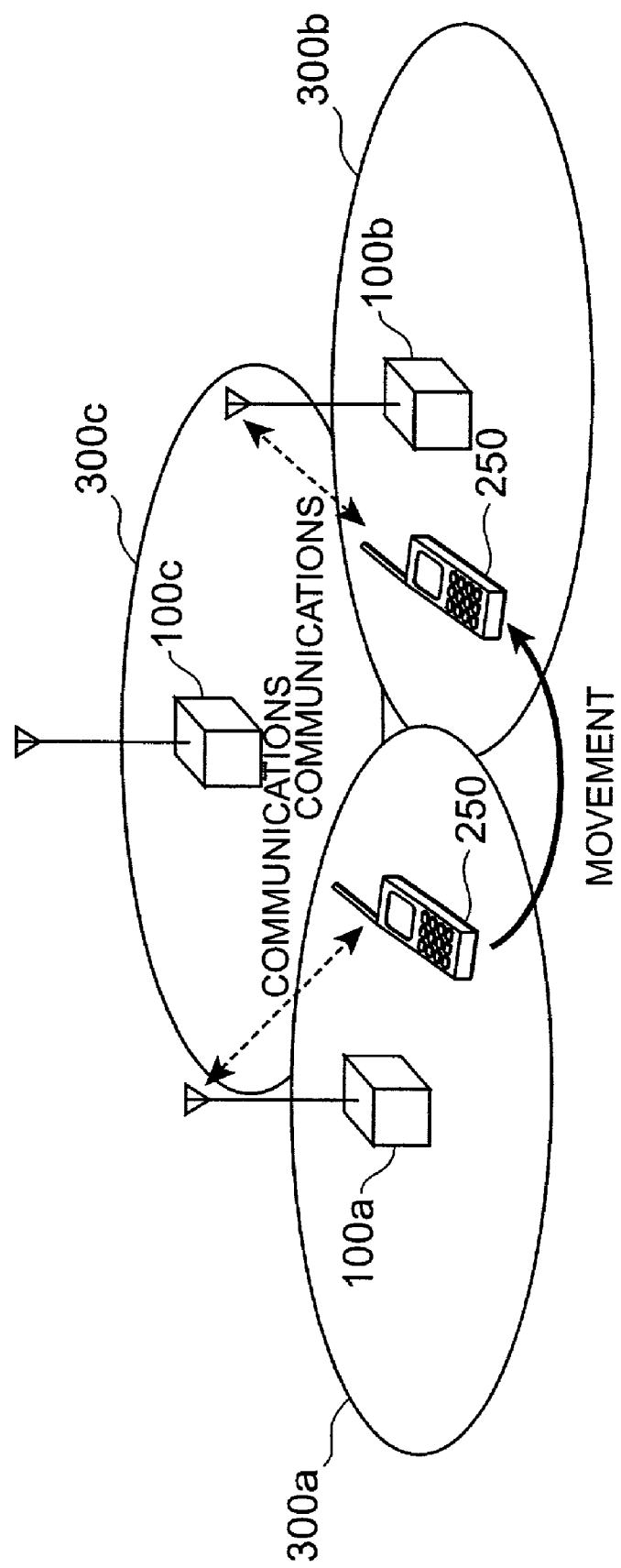
FIG. 4 is a diagram to show a schematic configuration of a mobile communication system wherein a mobile telephone is applied to the mobile station, as a specific example of the mobile communication system shown in FIG. 3.

For example, FIG. 4 is a diagram to show a schematic configuration of a mobile communication system wherein a mobile phone is applied to the above mobile station. In general, the mobile communication system is provided with base stations 100a, 100b, 100c having their respective fixed communication areas 300a, 300b, 300c. In a state in which the mobile phone 250 is located within the communication area 300a, the mobile phone 250 is linked to the base station 100a. Once the location of the mobile phone 250 becomes off the communication area 300a to move into the communication area 300b, the mobile phone 250 needs to establish new communications with the base station 100b from communications with the base station 100a in order to maintain the communication state. The spreading code synchronization method according to the present invention is provided with a structure to enable fast cell search on the occasion of handover of the mobile phone 250 from the base station 100a to the base station 100b. It is noted here that the mobile station is not limited to the mobile phone 250. For example, the mobile stations include portable computers, electronic notes, and, the automobiles, bicycles, motorcycles, trains, airplanes, ships, etc. equipped with the communication means.

Figure 5:
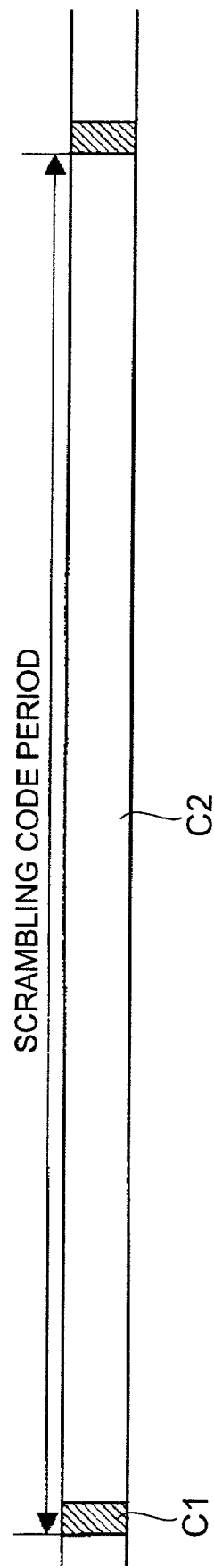
FIG. 5 is a diagram to show a transmitted frame from a base station to a mobile station, as the first embodiment of the spreading code synchronization method according to the present invention.

FIG. 5 is a diagram to show a signal frame transmitted from the base station to the mobile station in the first embodiment of the spreading code synchronization method according to the present invention. This signal frame includes a mask symbol C1 spread by only a common short code being a first spreading code common to base stations, and an information data symbol C2 spread by a combination of a scrambling code being a second spreading code assigned to each base station and the common short code being the first spread code common to the base stations, and the mask symbol C1 is inserted in every period of the scrambling code.

FIG. 6 is a flowchart for explaining the operation of the first embodiment of the spreading code synchronization method according to the present invention.

In the first embodiment the following processes are successively performed for the signal frame shown in FIG. 5: detection of received timing of the scrambling code (S401); and identification of the scrambling code.

First, the correlation is detected between the common short code replica and the signal (received signal) received by the mobile station (e.g., equivalent to the mobile phone 250 in FIG. 4), thereby detecting the received timing of the scrambling code mask from the handover destination cell (e.g., equivalent to the base station 100b in FIG. 4) (S411). At this time, in order to avoid detection of the received timing of the scrambling code mask of the connecting cell (e.g., equivalent to the base station 100a in FIG. 4), the received timing of the mask symbol from the connecting cell is excepted from a search range for the received timing of the scrambling code mask of the handover destination cell (S412).

In the next place, at the received timing of the scrambling code of the handover destination cell thus detected, a correlation between the received signal and a code of the product of the scrambling code and the common short code is detected for each scrambling code replica (S421), and the scrambling code of the received signal from the handover destination cell is detected from magnitudes of correlation values (S422).

FIGS. 7A to 7D are schematic diagrams to show an example of a method of excepting the received timing of the mask symbol from the connecting cell according to the present invention. FIG. 7A shows a signal frame transmitted from the connecting cell and FIG. 7B a signal frame transmitted from the cell of the handover destination. FIG. 7C is a diagram to show a method of identifying the received timing of the mask symbol of the connecting cell from received timings of paths of the connecting cell used in a rake receiver and excepting it from the search range for the received timing of the scrambling code mask of the handover destination cell, and FIG. 7D a diagram to show a method of excepting a range R of ±Δ chip from the received timings of the paths of the connecting cell used in the rake receiver. In FIGS. 7C and 7D, T1 indicates the received timing of the scrambling code from the connecting cell to be excepted, and T2 the received timing of the scrambling code of the handover destination cell.

Figure 8:
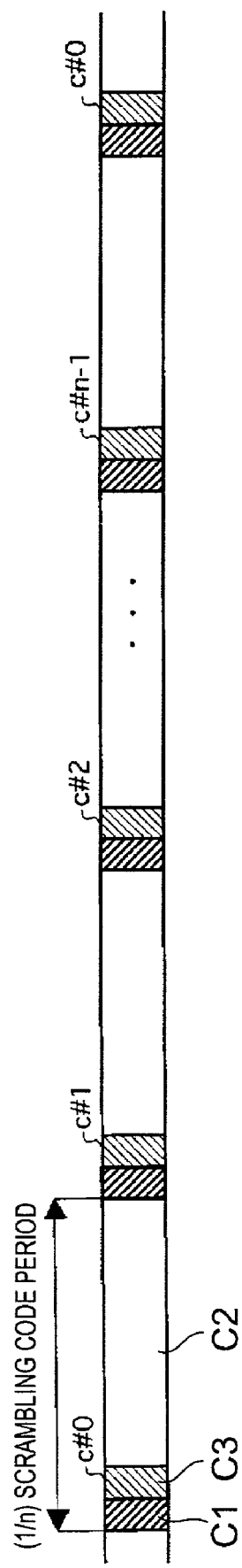
FIG. 8 is a diagram to show a transmitted frame from a base station to a mobile station, as the second embodiment of the spreading code synchronization method according to the present invention.

FIG. 8 is a diagram to show a signal frame transmitted from the base station to the mobile station in the second embodiment of the spreading code synchronization method according to the present invention. This signal frame includes a mask symbol C1 spread by only the common short code, an information data symbol C3 spread by a scrambling code timing indication code, and an information data symbol C2 spread by a combination of the common short code and the scrambling code. N mask symbols C1 are inserted in every scrambling code period, and the information data symbol C3 is further inserted in order to indicate the position of the head of each scrambling code. In the second embodiment, the information data symbol subsequent to the mask symbol C1 masked over the scrambling code, i.e., spread by only the common short code, is the information data symbol C3 spread by the scrambling code timing indication code. Used as the scrambling code timing indication codes are different spreading codes c#0 to c#n−1 according to the number of masks over the scrambling code from the head position of the scrambling code.

Figure 9:
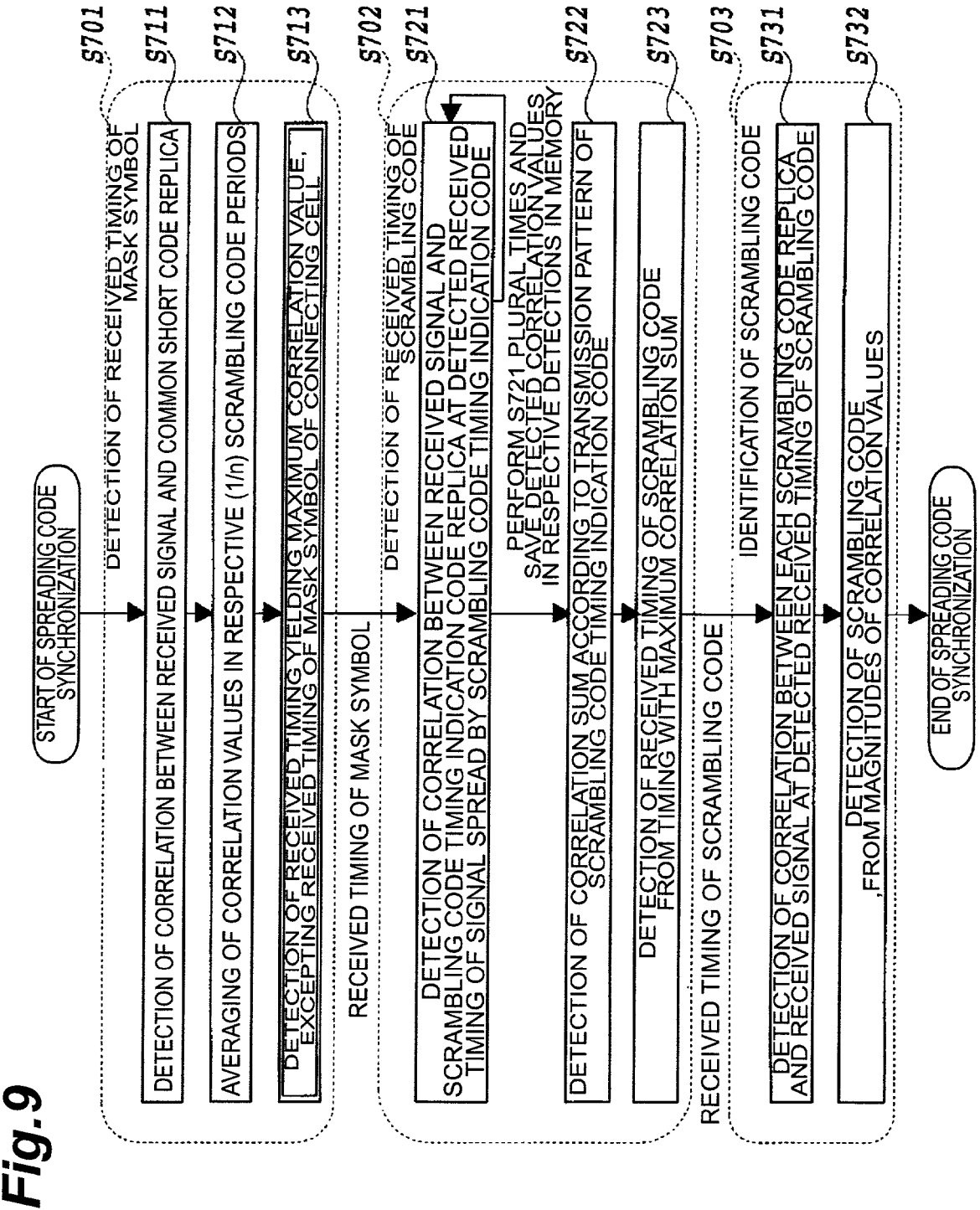
FIG. 9 is a flowchart for explaining the operation of the second embodiment of the spreading code synchronization method according to the present invention.

FIG. 9 is a flowchart for explaining the operation of the second embodiment of the spreading code synchronization method according to the present invention. In the second embodiment, the following processes are carried out in order for the signal frame shown in FIG. 8: detection of received timing of mask symbol (S701); detection of received timing of scrambling code (S702); and identification of scrambling code (S703).

First, the correlation is detected between the common short code replica and the signal received by the mobile station (S711), correlation values in respective (1/n) scrambling code periods are averaged (S712), and the received timing of the scrambling code mask of the handover destination cell is detected based thereon (S713). This detection of the received timing is carried out in a state in which the received timing of the mask symbol from the connecting cell is excepted from the search range for the received timing of the scrambling code mask from the handover destination cell, in order to avoid reception of the signal transmitted from the connecting cell. The method of exception can be the same method as shown in FIGS. 7A to 7D.

Then the received timing of the information data symbol C3 spread by the scrambling code timing indication code of the handover destination cell is determined from the received timing of the scrambling code mask of the handover destination cell detected. The correlation between the received signal and the scrambling code timing indication code replica is detected at the detected received timing of the information data symbol C3 of the handover destination cell thus determined (S721). The detection of correlation by each code of c#0 to c#n−1 shown in FIG. 8 is carried out at the received timings of continuous n information data symbols C3. For n correlation values, a correlation sum is determined using the known transmission pattern of the scrambling code timing indication code (S722). Then the received timing of the scrambling code of the handover destination cell is detected from the timing with maximum correlation sum (S723).

Further, at the detected received timing of the scrambling code of the handover destination cell detected, the correlation between the received signal and the code of the product of the scrambling code and the common short code is detected for each scrambling code replica (S731), and the scrambling code of the signal from the handover destination cell is detected from magnitudes of correlation values (S732).

The second embodiment permits the received timing of the scrambling code mask of the signal transmitted from the handover destination cell to be detected without detecting the received timing of the scrambling code mask from the connecting cell, which enables the detection of the cell of the handover destination.

Figure 10:
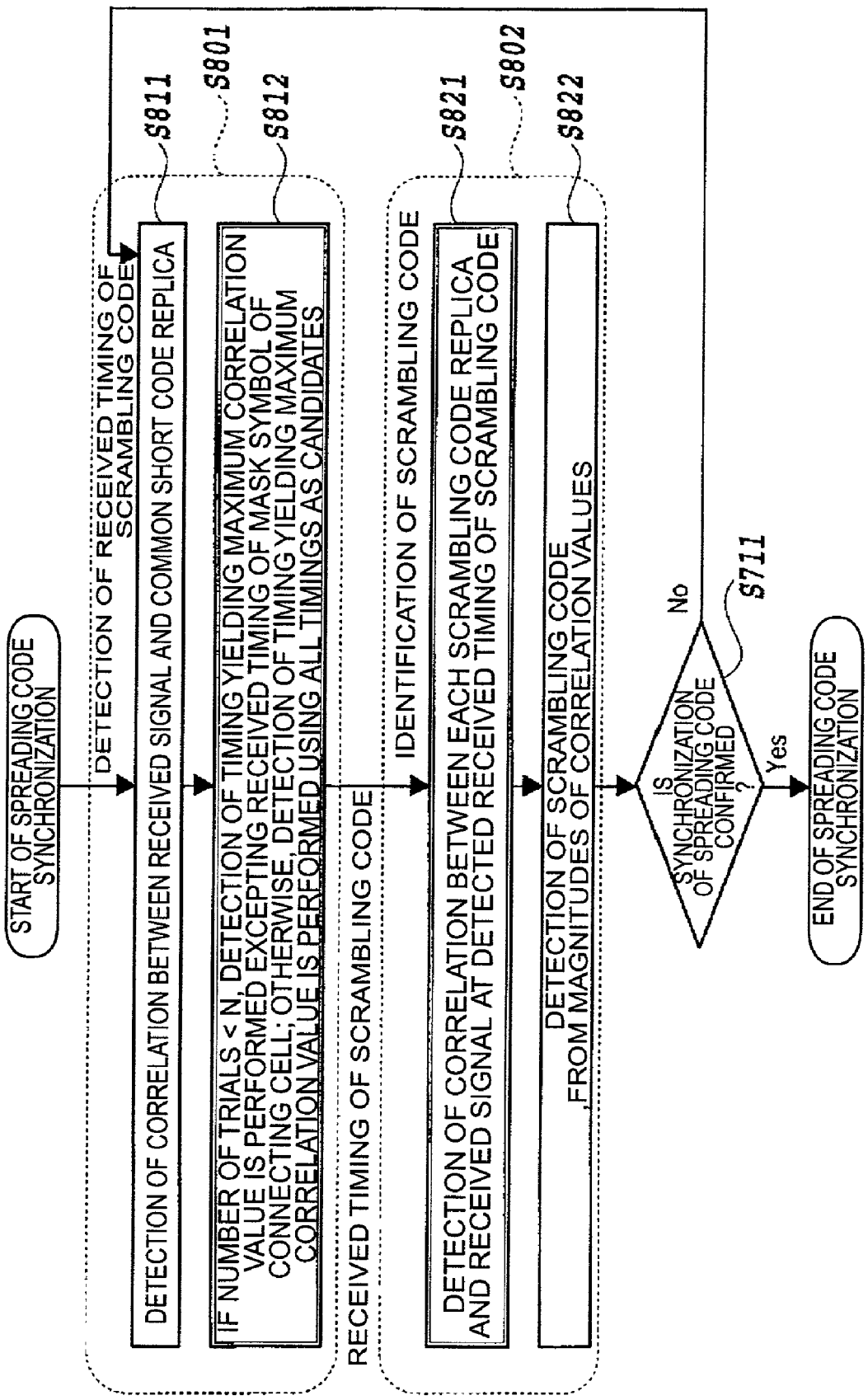
FIG. 10 is a flowchart for explaining the operation of the third embodiment of the spreading code synchronization method according to the present invention.

Next FIG. 10 is a flowchart for explaining the operation of the third embodiment of the spreading code synchronization method according to the present invention. In the third embodiment, the following processes are carried out for the signal frame shown in FIG. 5: detection of received timing of scrambling code (S801); and identification of scrambling code (S802). First, the correlation is detected between the received signal and the common short code replica (S811) and the received timing of the scrambling code mask of the handover destination cell is detected based thereon (S812). At this time, in order to avoid reception of the signal transmitted from the connecting cell, the received timing of the mask symbol from the connecting cell is excepted from the search range for the received timing of the scrambling code mask of the handover destination cell.

Next, at the detected received timing of the scrambling code of the handover destination cell detected, the correlation between the received signal and the code of the product of the scrambling code and the common short code is detected for each scrambling code candidate (S821), and the scrambling code of the signal transmitted from the handover destination cell is detected from magnitudes of correlation values (S822).

After the processes of the detection of received timing of scrambling code (S801) and the identification of scrambling code (S802) are repeated N times and when there is no surrounding cell detected, the detection of the received timing of the scrambling code mask of the handover destination cell thereafter is carried out using all the received timings as candidates for the received timing of the scrambling code mask from the handover destination cell (S812).

Figure 11:
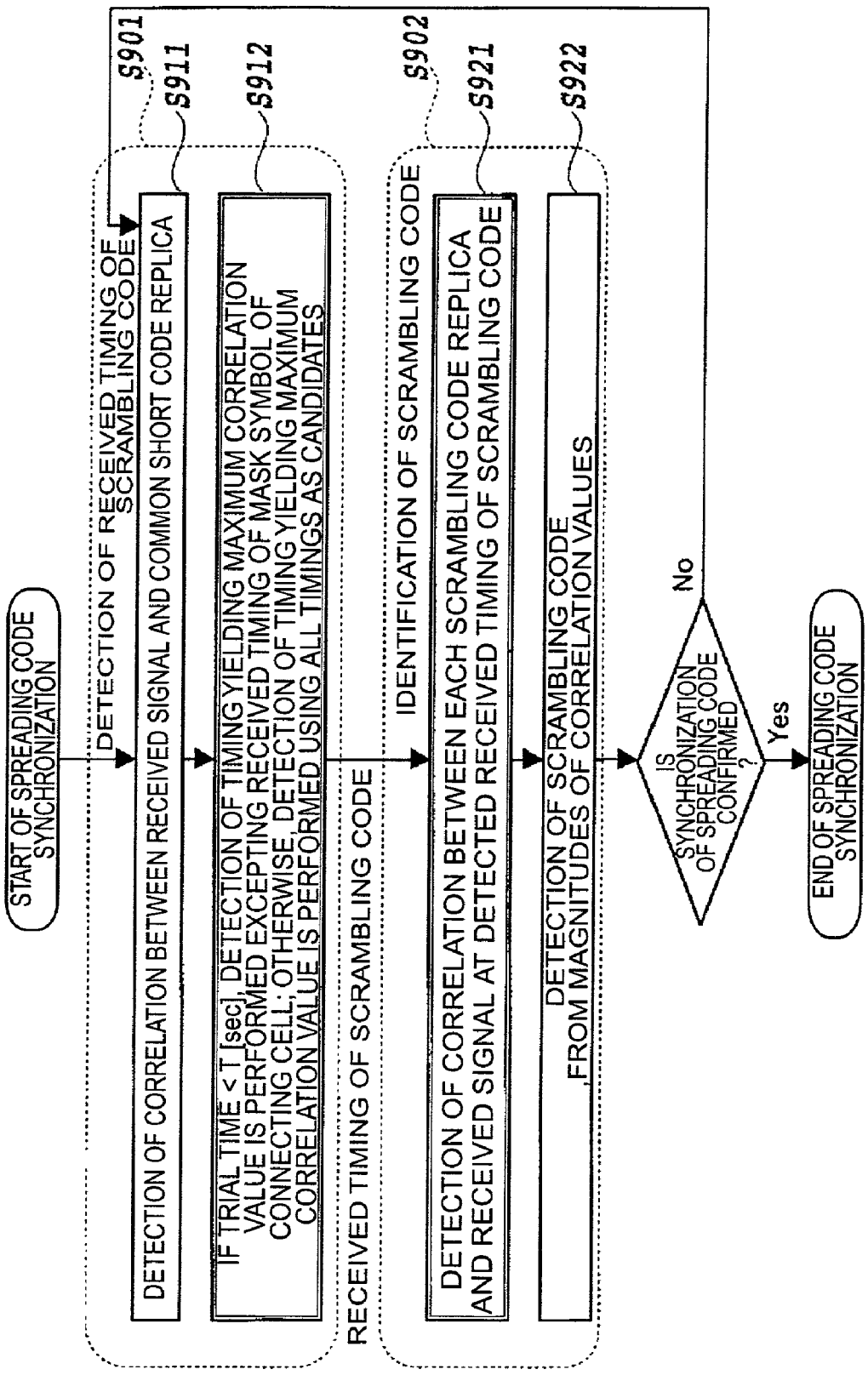
FIG. 11 is a flowchart for explaining the operation of the fourth embodiment of the spreading code synchronization method according to the present invention.

Next, FIG. 11 is a flowchart for explaining the operation of the fourth embodiment of the spreading code synchronization method according to the present invention. In the fourth embodiment, the following processes are carried out in order for the signal frame shown in FIG. 5: detection of received timing of scrambling code (S901); and identification of scrambling code (S902).

First, the correlation is detected between the received signal and the common short code replica (S911) and the received timing of the scrambling code mask from the handover destination cell is determined based thereon (S912). At this time, in order to avoid reception of the signal transmitted from the connecting cell, the received timing of the mask symbol from the connecting cell is excepted from the search range for the received timing of the scrambling code mask from the handover destination cell.

Then, at the detected received timing of the scrambling code of the handover destination cell detected, the correlation between the received signal and the product of the scrambling code and the common short code is detected for each scrambling code replica (S921), and the scrambling code of the signal received from the handover destination cell is detected from magnitudes of correlation values (S922).

After the processes of the detection of received timing of scrambling code (S901) and the identification of scrambling code (S902) are repeated plural times and when there is no surrounding cell even after a lapse of T sec, the detection of the received timing of the scrambling code mask from the handover destination cell thereafter is carried out using all the received timings as candidates for the received timing of the scrambling code mask from the handover destination cell (S912).

The third and fourth embodiments permit the received timing of the scrambling code mask from the handover destination cell to be determined even if the received timing of the scrambling code mask from the connecting cell coincides with the received timing of the scrambling code mask from the handover destination cell; thus the fourth embodiment enables the detection of the cell being the handover destination.

Figure 12:
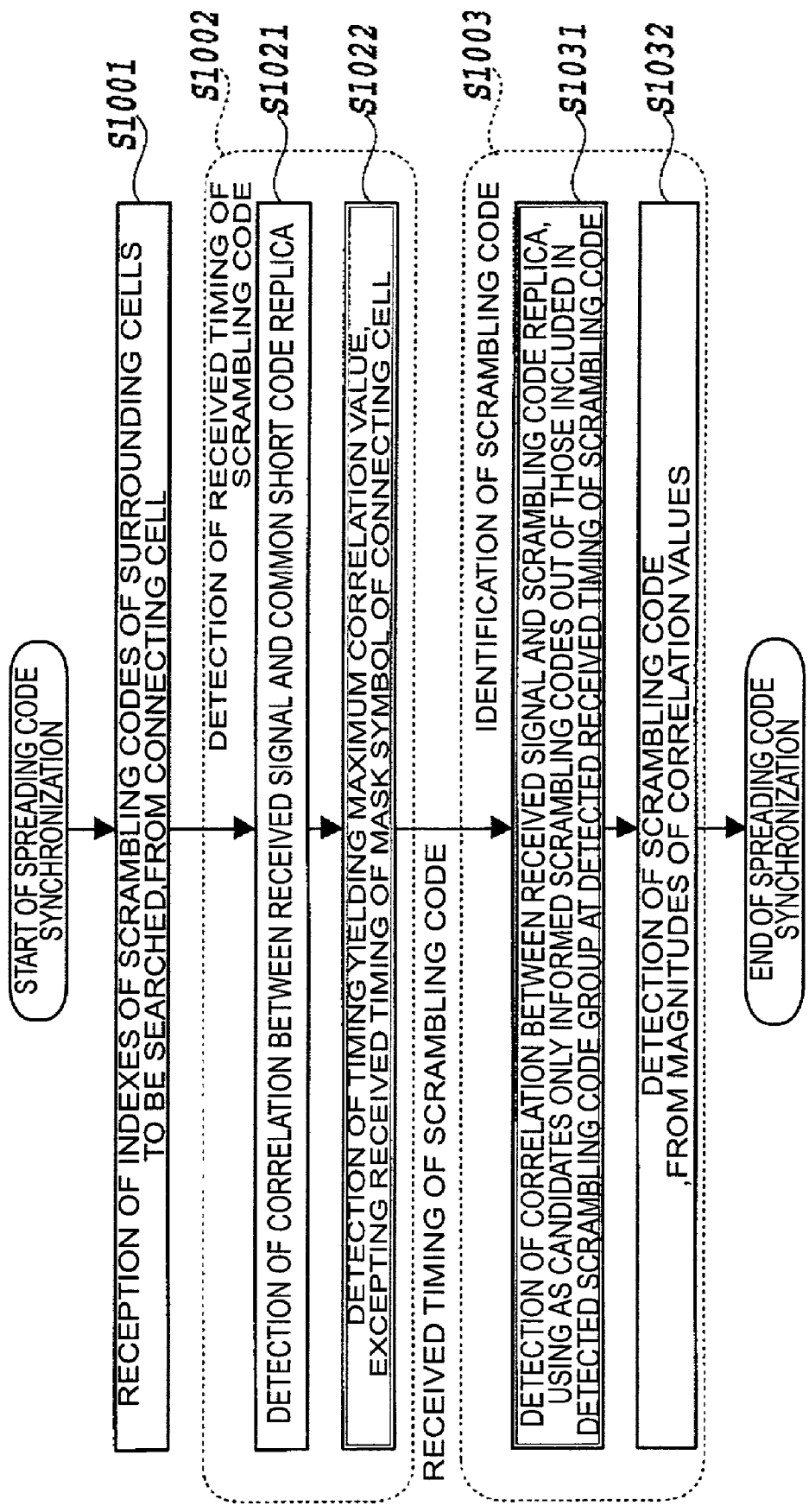
FIG. 12 is a flowchart for explaining the operation of the fifth embodiment of the spreading code synchronization method according to the present invention.

Next, FIG. 12 is a flowchart for explaining the operation of the fifth embodiment of the spreading code synchronization method according to the present invention. In the fifth embodiment, the following processes are carried out in order: reception of indexes of scrambling codes of surrounding cells to be searched, from the connecting cell (S1001); subsequent thereto, detection of received timing of scrambling code (S1002); and identification of scrambling code (S1003).

First, subsequent to the reception of the indexes of the scrambling codes (S1001), the correlation is detected between the received signal and the common short code replica (S1021) and the received timing of the scrambling code mask of the handover destination cell is determined based thereon (S1022). At this time, in order to avoid reception of the signal transmitted from the connecting cell, the received timing of the mask symbol from the connecting cell is excepted from the search range for the received timing of the scrambling code mask of the handover destination cell.

Further, at the detected received timing of the scrambling code of the handover destination cell detected, the correlation between the received signal and the product of the scrambling code and the common short code is detected for each scrambling code replica (S1031), and the scrambling code of the signal received from the handover destination cell is detected from magnitudes of correlation values (S1032). On the occasion of identifying the scrambling code of the signal transmitted from the handover destination cell, the identification is carried out using as candidates only the scrambling codes assigned to the surrounding cells to be searched, which were informed of by the connecting cell (S1031).

In the fifth embodiment, there is no need for determining the correlations for all the scrambling codes prepared in the mobile communication system on the occasion of identifying the scrambling code of the handover destination cell, but it is sufficient to determine the correlations for only the informed scrambling codes (normally, about 20 codes), which can largely decrease the time necessary for the identification.

Figure 13:
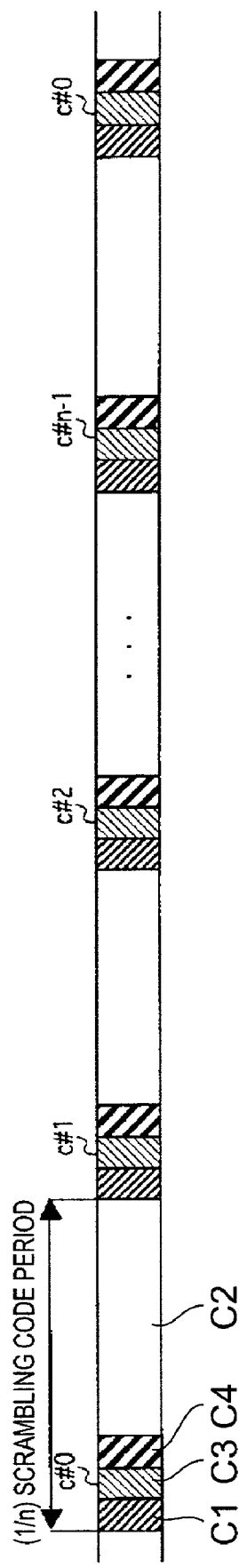
FIG. 13 is a diagram to show a transmitted frame from a base station to a mobile station, as the sixth embodiment of the spreading code synchronization method according to the present invention.

Next, FIG. 13 is a drawing to show a signal frame transmitted from the base station to the mobile station in the sixth embodiment of the spreading code synchronization method according to the present invention. This signal frame includes a mask symbol C1 spread by only the common short code, an information data symbol C2 spread by a combination of the common short code and the scrambling code, an information data symbol C3 spread by the scrambling code timing indication code, and an information data symbol C4 spread by a scrambling code group ID code. N mask symbols C1 are inserted at equal intervals in every scrambling code period, and the information data symbol C3 is inserted in order to indicate the position of the head of the scrambling code. In the sixth embodiment, the information data symbol subsequent to the mask symbol masked over the scrambling code, i.e., spread by only the common short code, is the information data symbol C3 spread by the scrambling code timing indication code. Further, the information data symbol subsequent to the information data symbol C3 is the information data symbol C4 spread by the scrambling code group ID code.

Figure 14:
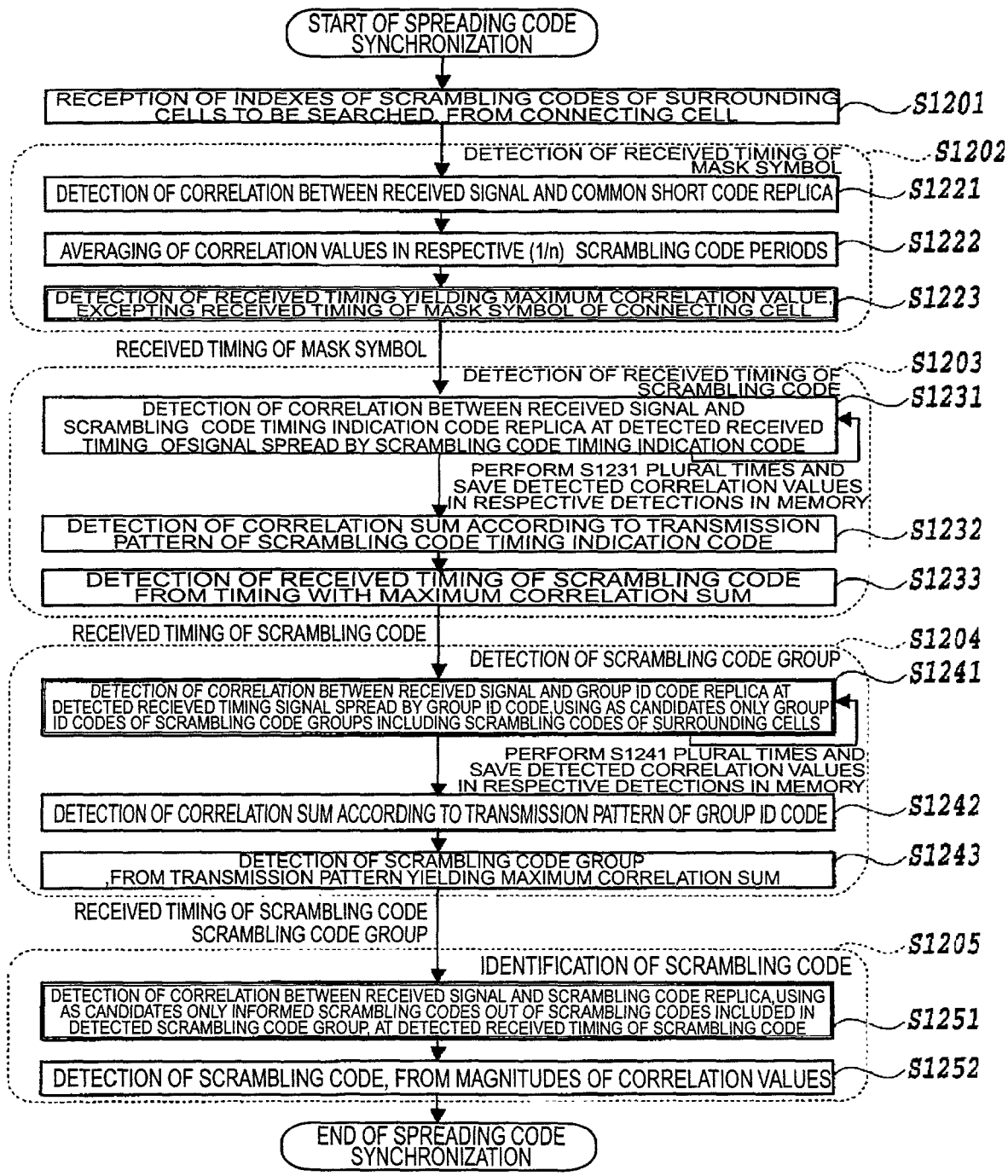
FIG. 14 is a flowchart for explaining the operation of the sixth embodiment of the spreading code synchronization method according to the present invention.

Next, FIG. 14 is a flowchart for explaining the operation of the sixth embodiment of the spreading code synchronization method according to the present invention. In the sixth embodiment, the following processes are carried out in order for the signal frame shown in FIG. 13: reception of indexes of scrambling codes of surrounding cells to be searched, from the connecting cell (S1201); subsequent thereto, detection of received timing of mask symbol (S1202); detection of received timing of scrambling code replica (S1203); detection of scrambling code group (S1204); and identification of scrambling code (S1205).

First, subsequent to the reception of the indexes of the scrambling codes (S1201), the correlation is detected between the received signal and the common short code replica (S1221), correlation values in respective (1/n) scrambling code periods are averaged (S1222), and the received timing of the scrambling code mask from the handover destination cell is determined based thereon (S1223). At this time, in order to avoid detection of the received timing of the scrambling code mask of the connecting cell, the received timing of the mask symbol from the connecting cell is excepted from the search range for the received timing of the scrambling code mask from the handover destination cell.

Then the received timing of the information data symbol C3 spread by the scrambling code timing indication code from the handover destination cell is determined from the received timing of the scrambling code mask from the handover destination cell detected. At the detected received timing of the information data symbol C3 of the handover destination cell obtained, the correlation is detected between the received signal and the scrambling code timing indication code replica (S1231). The correlation detection by each code of c#0 to c#n−1 shown in FIG. 13 (S1231) is carried out at the received timings of continuous n information data symbols. For n correlation values, a correlation sum is detected using the known transmission pattern of the scrambling code timing indication code (S1232). Then the received timing of the scrambling code of the handover destination cell is detected from the timing with a maximum correlation sum (S1233).

In the process of the detection of the scrambling code group of the handover destination cell (S1204), which is carried out after the detection of the received timing of the scrambling code, the correlation is first detected between the received signal and each scrambling code group ID code replica at the received timing of the information data symbol C4 of the handover destination cell determined from the received timing of the scrambling code mask of the handover destination cell detected (S1241). At this time, the correlation is detected using as candidates only the scrambling code group ID codes of scrambling code groups including the scrambling codes of the surrounding cells to be searched, informed of by the connecting cell. For resultant correlation values, a correlation sum is detected using the known transmission pattern of the scrambling code group ID code (S1242). A scrambling code group including the scrambling code of the handover destination cell, is determined from the transmission pattern yielding a maximum correlation sum (S1243).

Further, in the identification of the scrambling code (S1205), the correlation between the received signal and the scrambling code replica is detected using as candidates only the informed scrambling codes out of the scrambling codes included in the detected scrambling code group (S1251). The scrambling code of the signal transmitted from the handover destination cell is detected from magnitudes of correlation values detected (S1252).

In the sixth embodiment, there is no need for determining the correlations with all the scrambling code group ID codes on the occasion of carrying out the detection of the scrambling code group of the handover destination cell but it is sufficient to determine the correlations with the scrambling code group ID codes to which the informed scrambling codes belong (normally, about 20 codes). In addition, on the occasion of carrying out the identification of the scrambling code of the handover destination cell, it is sufficient to determine the correlations with only the informed scrambling codes, without detecting the correlations between the received signal and all the scrambling codes prepared in the mobile communication system, which can largely decrease the time necessary for the identification.

Figure 15:
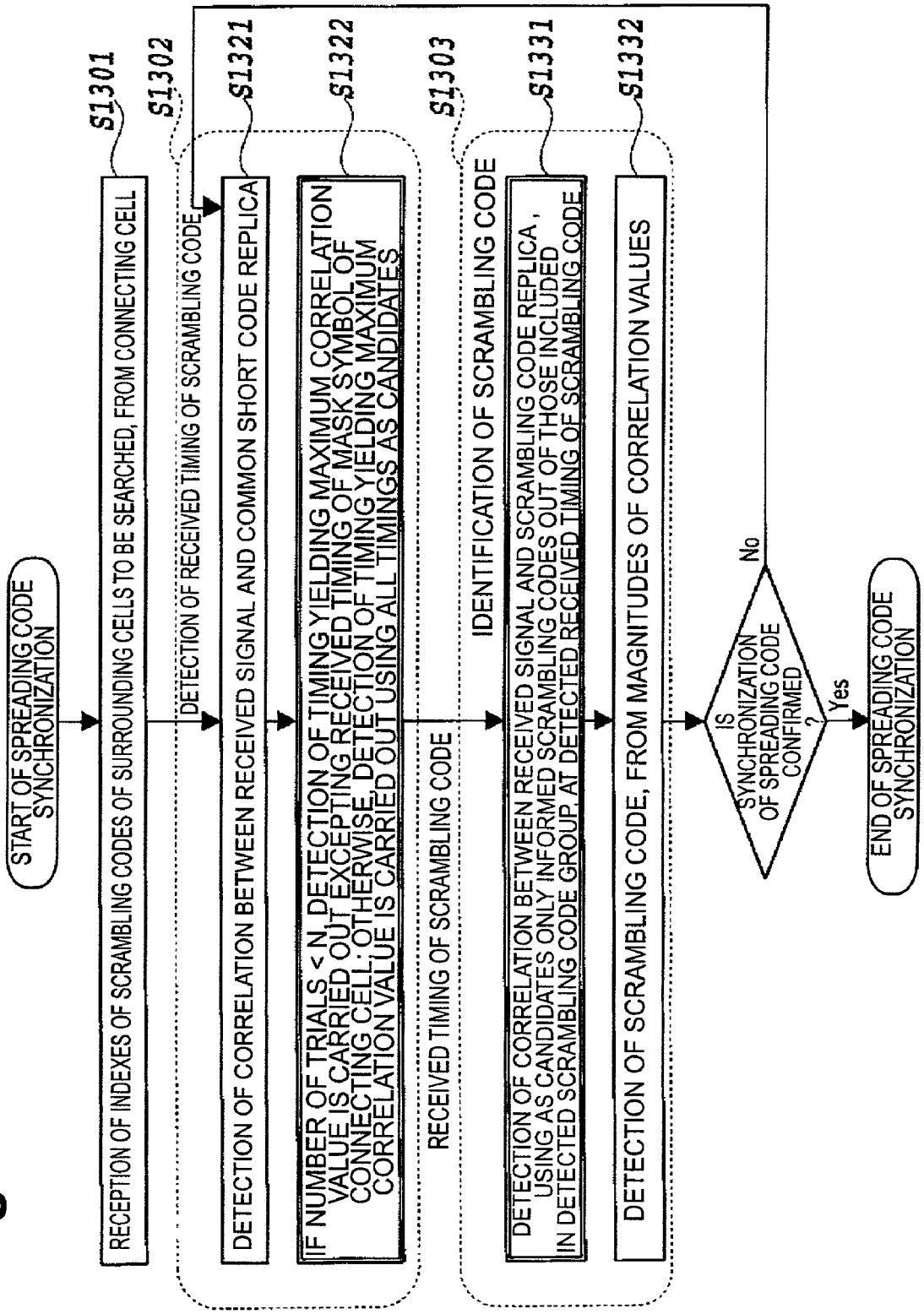
FIG. 15 is a flowchart for explaining the operation of the seventh embodiment of the spreading code synchronization method according to the present invention.

FIG. 15 is a flowchart for explaining the operation of the seventh embodiment of the spreading code synchronization method according to the present invention. In the seventh embodiment, the following processes are carried out in order: reception of indexes of scrambling codes of surrounding cells to be searched, from the connecting cell (S1301); subsequent thereto, detection of received timing of scrambling code replica (S1302); and identification of scrambling code (S1303).

First, subsequent to the reception of indexes of scrambling codes (S1301), the correlation is detected between the received signal and the common short code (S1321) and the received timing of the scrambling code mask from the handover destination cell is determined based thereon (S1322). At this time, in order to avoid reception of the signal transmitted from the connecting cell, the received timing of the mask symbol from the connecting cell is excepted from the search range for the received timing of the scrambling code mask from the handover destination cell.

Further, at the received timing of the scrambling code of the handover destination cell detected, the correlation between the received signal and the code of the product of the scrambling code and the common short code is detected for each scrambling code candidate (S1331), and the scrambling code of the signal transmitted from the handover destination cell is detected from magnitudes of correlation values (S1332). On the occasion of carrying out the identification of the scrambling code of the signal transmitted from the handover destination cell, the identification is implemented using as candidates only the scrambling codes of the surrounding cells to be searched, informed of by the connecting cell (S1331).

After the detection of received timing of scrambling code (S1302) and the identification of scrambling code (S1303) are repeated N times in this way and when there is no surrounding cell detected, the detection of the received timing of the scrambling code mask from the handover destination cell thereafter is carried out using all the received timings as candidates for the received timing of the scrambling code mask from the handover destination cell (S1322).

Figure 16:
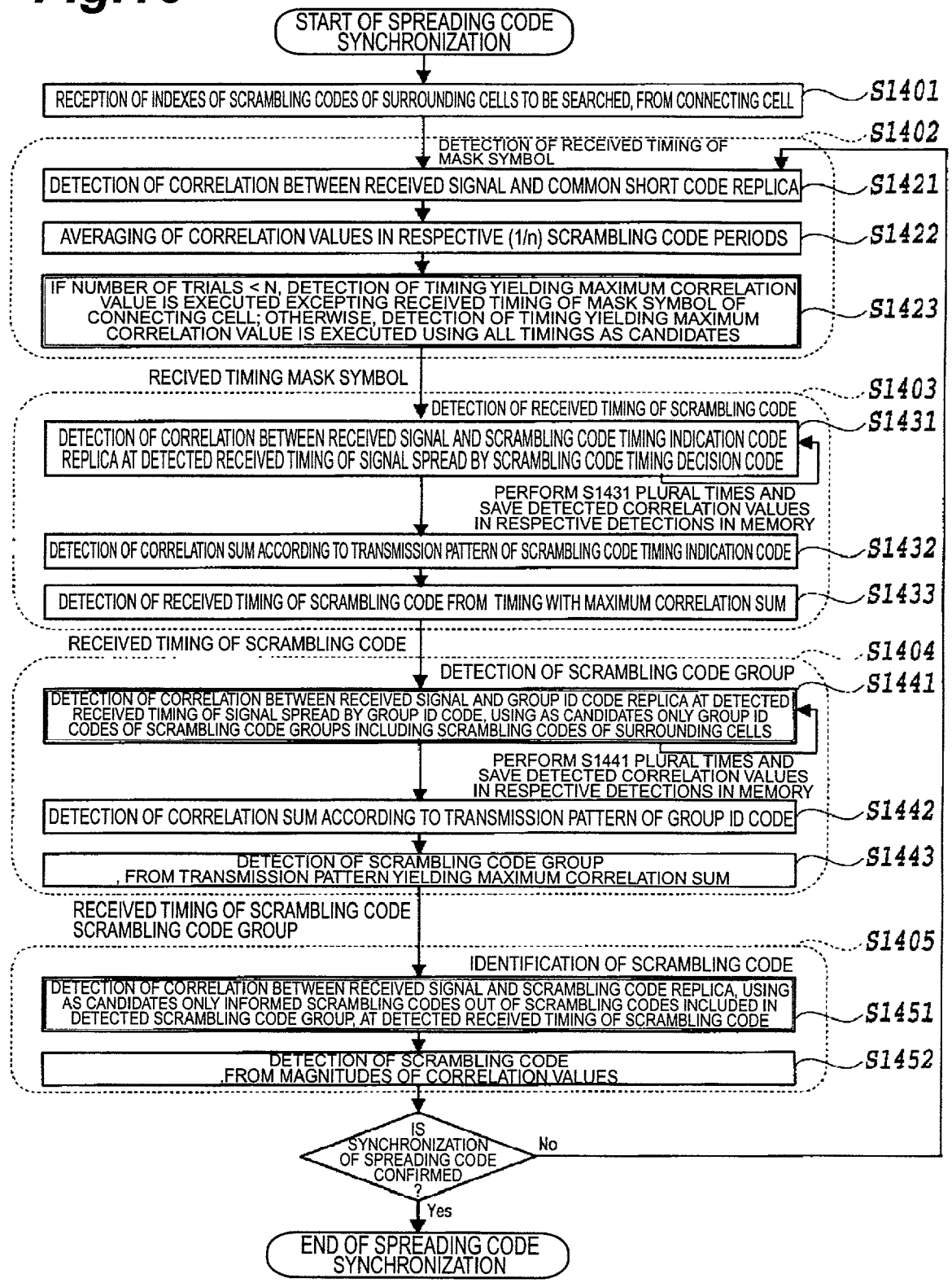
FIG. 16 is a flowchart for explaining the operation of the eighth embodiment of the spreading code synchronization method according to the present invention.

Next, FIG. 16 is a flowchart for explaining the operation of the eighth embodiment of the spreading code synchronization method according to the present invention. In the eighth embodiment, the following processes are carried out in order: reception of indexes of scrambling codes of surrounding cells to be searched, from the connecting cell (S1401); subsequent thereto, detection of received timing of mask symbol (S1402); detection of received timing of scrambling code (S1403); detection of scrambling code group (S1404); and identification of scrambling code (S1405).

First, subsequent to the reception of indexes of scrambling codes (S1401), the correlation is detected between the received signal and the common short code replica (S1421), correlation values in respective (1/n) scrambling code periods are averaged (S1422), and the received timing of the scrambling code mask of the handover destination cell is determined based thereon (S1423). At this time, in order to avoid reception of the signal transmitted from the connecting cell, the received timing of the mask symbol from the connecting cell is excepted from the search range for the received timing of the scrambling code mask from the handover destination cell.

In the next place, the received timing of the information data symbol C3 of the handover destination cell is determined from the received timing of the scrambling code mask of the handover destination cell detected. At the detected received timing of the information data symbol C3 of the handover destination cell determined, the correlation is detected between the received signal and the scrambling code timing indication code replica (S1431). The correlation detection with each code of c#0 to c#n−1 shown in FIG. 13 is carried out at received timings of continuous n information data symbols C3. For n correlation values, a correlation sum is detected using the known transmission pattern of the scrambling code timing indication code (S1432). Then the received timing of the scrambling code of the handover destination cell is detected from the timing with a maximum correlation sum (S1433).

In the detection of scrambling code group (S1404), the correlation between the received signal and each scrambling code group ID code replica is detected at the detected received timing of information data symbol C4 of the handover destination cell determined from the received timed of the scrambling code mask from the handover destination cell detected (S1441). At this time, the correlation is detected using as candidates only the scrambling code group ID codes of scrambling code groups including the scrambling codes of the surrounding cells to be searched, informed of by the connecting cell. For resultant correlation values, a correlation sum is detected using the known transmission pattern of the scrambling code group ID code (S1442). Then a scrambling code group including the scrambling code of the handover destination cell is determined from the transmission pattern yielding the maximum correlation sum (S1443).

Further, in the identification of the scrambling code of the handover destination cell (S1405), the correlation between the received signal and the scrambling code replica is detected using as candidates only the informed scrambling codes out of the scrambling codes included in the detected scrambling code group (S1451) The scrambling code of the signal transmitted from the handover destination cell is detected from magnitudes of detected correlation values (S1452).

After the operations from the detection of received timing of scrambling code (S1402) to the identification of scrambling code (S1405) are repeated N times and when there is no surrounding cell detected, the detection of the received timing of the scrambling code mask from the handover destination cell thereafter is carried out using all the received timings as candidates for the received timing of the scrambling code mask from the handover destination cell (S1423).

According to the eighth embodiment, the received timing of the scrambling code mask from the handover destination cell can be determined even if the received timing of the scrambling code mask from the connecting cell coincides with the received timing of the scrambling code mask from the handover destination cell, and thus the eighth embodiment enables the detection of the cell being the handover destination.

Figure 17:
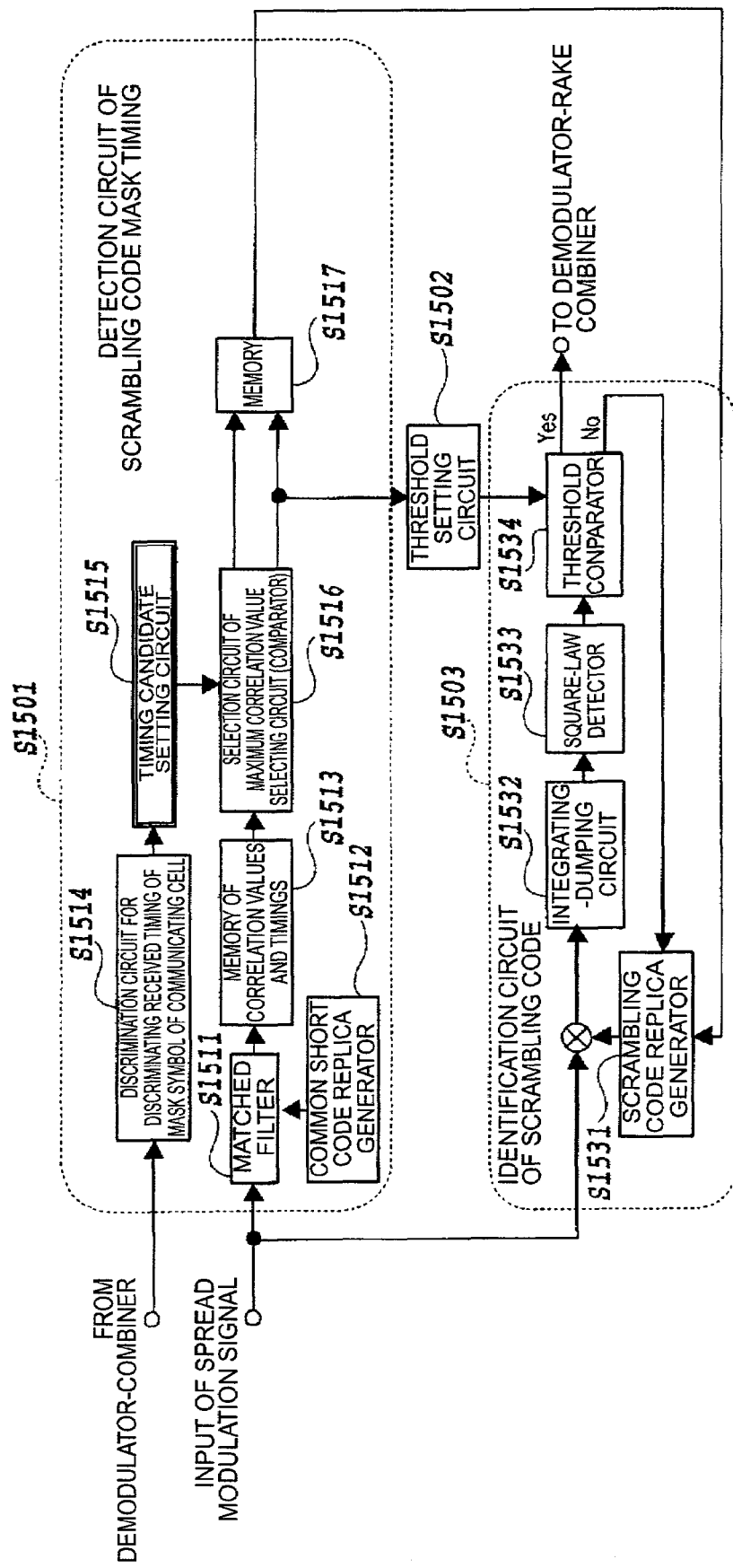
FIG. 17 is a block diagram to show a configuration of the first embodiment of the receiver for implementing the spreading code synchronization method according to the present invention.

FIG. 17 is a block diagram to show a configuration of the first embodiment of the receiver (the receiver according to the present invention) for implementing the spreading code synchronization method according to the present invention. This receiver is included in the communication means of the mobile station such as the mobile phone or the like as described above.

This receiver according to the first embodiment consists of a scrambling code mask timing detection circuit 1501 for detecting the scrambling code mask timing, a threshold setting circuit 1502 for determining a threshold value corresponding to a maximum correlation value from the scrambling code mask timing detection circuit 1501, and a scrambling code identification circuit 1503 for identifying the scrambling code, based on the scrambling code mask timing from the scrambling code mask timing detection circuit 1501 and the threshold value from the threshold determining circuit 1502.

In the receiver of the first embodiment, the scrambling code mask timing detection circuit 1501 receives a spread modulation signal and feeds it into a matched filter 1511. On the other hand, a common short code replica generator 1512 generates a spreading code replica being the short code of the scrambling code masked portions common to the base stations and outputs it to the matched filter 1511. The matched filter 1511 detects the correlation between the received spread modulation signal and the spreading code replica over N scrambling code periods and a memory 1513 stores correlation values and timings of respective peaks obtained by the correlation detection.

Receiving the information about positions of rake fingers of the connecting cell in a demodulator-rake combiner, a mask symbol received timing discrimination circuit 1514 discriminates the received timing of the mask symbol of the connecting cell. A timing candidate setting circuit 1515 excepts the received timing of the mask symbol from the mask symbol received timing discrimination circuit 1514, from candidates for the received timing of the mask symbol of the handover destination cell.

A maximum correlation output selection circuit 1516 selects a maximum correlation value and timing thereof from stored values in the memory 1513 at the timing set by the timing candidate setting circuit 1515, and a memory 1517 stores them. Then this memory 1517 outputs the scrambling code mask timing.

In the scrambling code identification circuit 1503, the phase of scrambling code replica generator 1531 is set to the synchronous phase obtained from the scrambling code mask timing. Then an integrating-dumping circuit 1532 integrates a product signal of the scrambling code from the scrambling code replica generator 1531 and the received spread modulation signal and thereafter a square-law detector 1533 performs the square-law detection of the integration result.

A comparator 1534 compares the resultant value of the square-law detection with the threshold value supplied from the threshold determining circuit 1502 to make a judgment with the threshold. When the resultant of square-law detection exceeds the threshold, the comparator 1534 judges that synchronization is established, and then informs the well-known demodulator-rake combiner of the judgment. When the resultant is below the threshold on the other hand, the comparator 1534 outputs a judgment signal to change the scrambling code of the scrambling code replica generator 1531.

Figure 18:
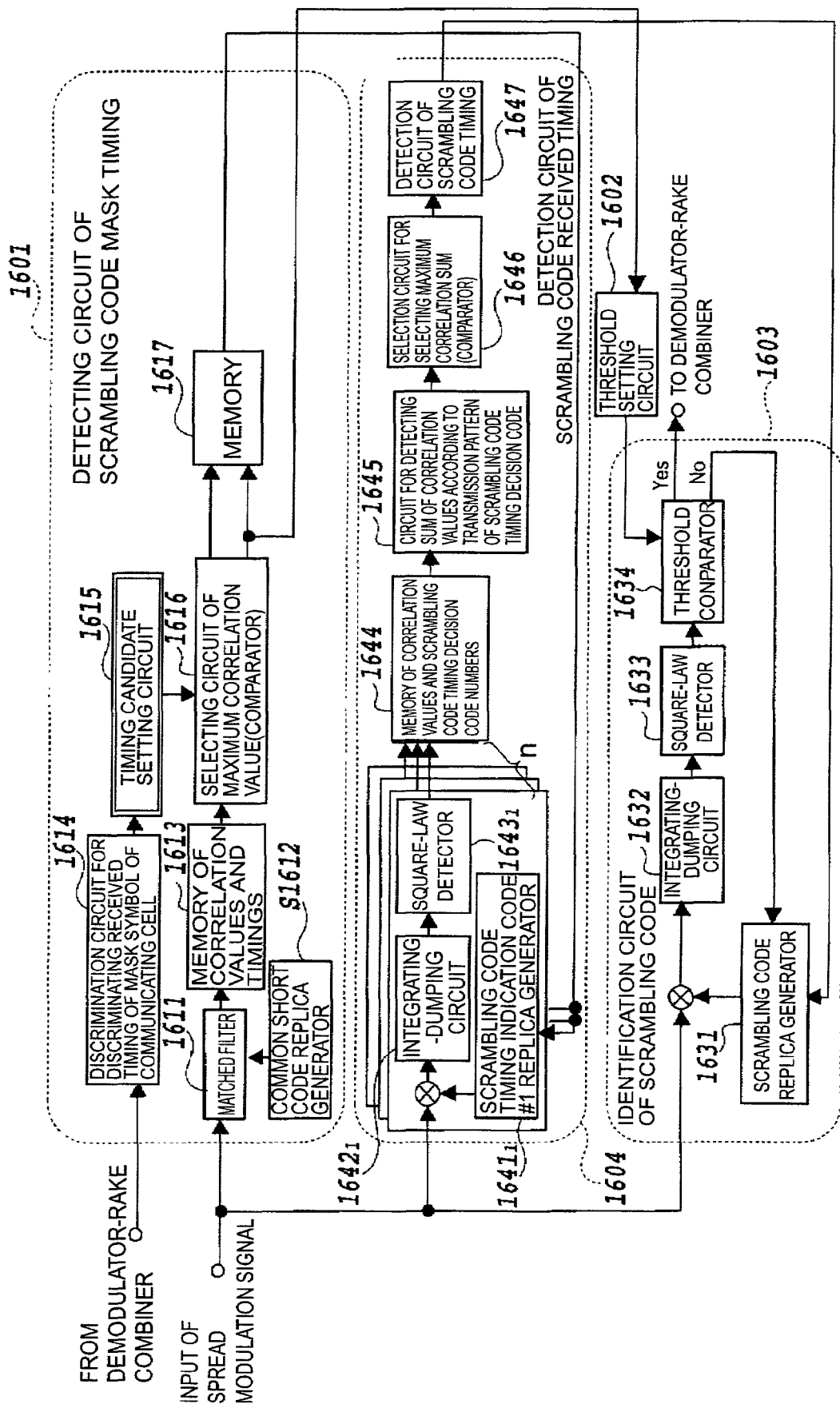
FIG. 18 is a block diagram to show a configuration of the second embodiment of the receiver for implementing the spreading code synchronization method according to the present invention.

FIG. 18 is a block diagram to show a configuration of the second embodiment of the receiver for implementing the spreading code synchronization method according to the present invention.

The receiver of the second embodiment consists of a scrambling code mask timing detection circuit 1601 for detecting the scrambling code mask timing, a threshold determining circuit 1602 for determining a threshold value corresponding to a maximum correlation value from the scrambling code mask timing detection circuit 1601, a scrambling code received timing detection circuit 1604 for detecting the received timing of the scrambling code from the scrambling code mask timing fed from the scrambling code mask timing detection circuit 1601, and a scrambling code identification circuit 1603 for identifying the scrambling code, based on the received timing of the scrambling code from the scrambling code received timing detection circuit 1604 and the threshold value from the threshold determining circuit 1602.

In the receiver of the second embodiment, the scrambling code mask timing detection circuit 1601 receives the spread modulation signal and feeds it into a matched filter 1611. On the other hand, a common short code replica generator 1612 generates a spreading code replica being the short code of the scrambling code masked portions common to the base stations and feeds it into the matched filter 1611. The matched filter 1611 detects the correlation of the spreading code replica with the received spread modulation signal over N scrambling code periods and a memory 1613 stores correlation values and timings of respective peaks obtained by the correlation detection.

Receiving the information about rake finger positions of the connecting cell in the demodulator-rake combiner, a mask symbol received timing discrimination circuit 1614 discriminates the received timing of the mask symbol of the connecting cell. A timing candidate setting circuit 1615 excepts the received timing of the mask symbol fed from the mask symbol received timing discrimination circuit 1614, from candidates for the received timing of the mask symbol of the handover destination cell.

A maximum correlation output selection circuit 1616 selects a maximum correlation value and timing from stored values in the memory 1613 at the timing set by the timing candidate setting circuit 1615, and a memory 1617 stores them. Then this memory 1617 outputs the scrambling code mask timing.

In the scrambling code received timing detection circuit 1604, scrambling code timing indication code replica generators $1641_1$ to $1641_n$ generate respective scrambling code timing indication codes, based on the scrambling code mask timing detected by the scrambling code mask timing detector 1601. Correlations are detected between the received spread modulation signal and the scrambling code timing indication codes at received timing candidates of symbols spread by the scrambling code timing indication codes. The detected correlation signals are integrated each over one symbol period by integrating-dumping circuits $1641_1$ to $1642_n$ and thereafter square-law detectors $1643_1$ to $1643_n$ perform the square-law detection of integral results.

A memory 1644 stores the resultant scrambling code timing indication code numbers, correlation values, and correlation detection times. A detection circuit 1645 detects correlation value sums according to the transmission pattern of the scrambling code timing indication codes at the different correlation detection times, for the resultant correlation values. A selection circuit 1646 selects a correlation detection time yielding a maximum correlation value sum. From the correlation detection time selected by the selection circuit 1646, a scrambling code timing detection circuit 1647 detects the received timing of the scrambling code.

In the scrambling code identification circuit 1603, the phase of scrambling code replica generator 1631 is set to the synchronous phase obtained from the received timing of the scrambling code. On the other hand, an integrating-dumping circuit 1632 integrates a product signal of the scrambling code from scrambling code replica generator 1631 and the received spread modulation signal and thereafter a square-law detector 1633 performs the square-law detection of the integral result.

A comparator 1634 compares the result of the square-law detection with the threshold value from the threshold determining circuit 1602 to make a judgment with the threshold value. When the result of square-law detection exceeds the threshold, the comparator determines that synchronization is established, and then informs the known demodulator-rake combiner of the judgment. When the result is below the threshold, the comparator 1634 outputs a judgment signal to change the scrambling code in the scrambling code replica generator 1631.

Figure 19:
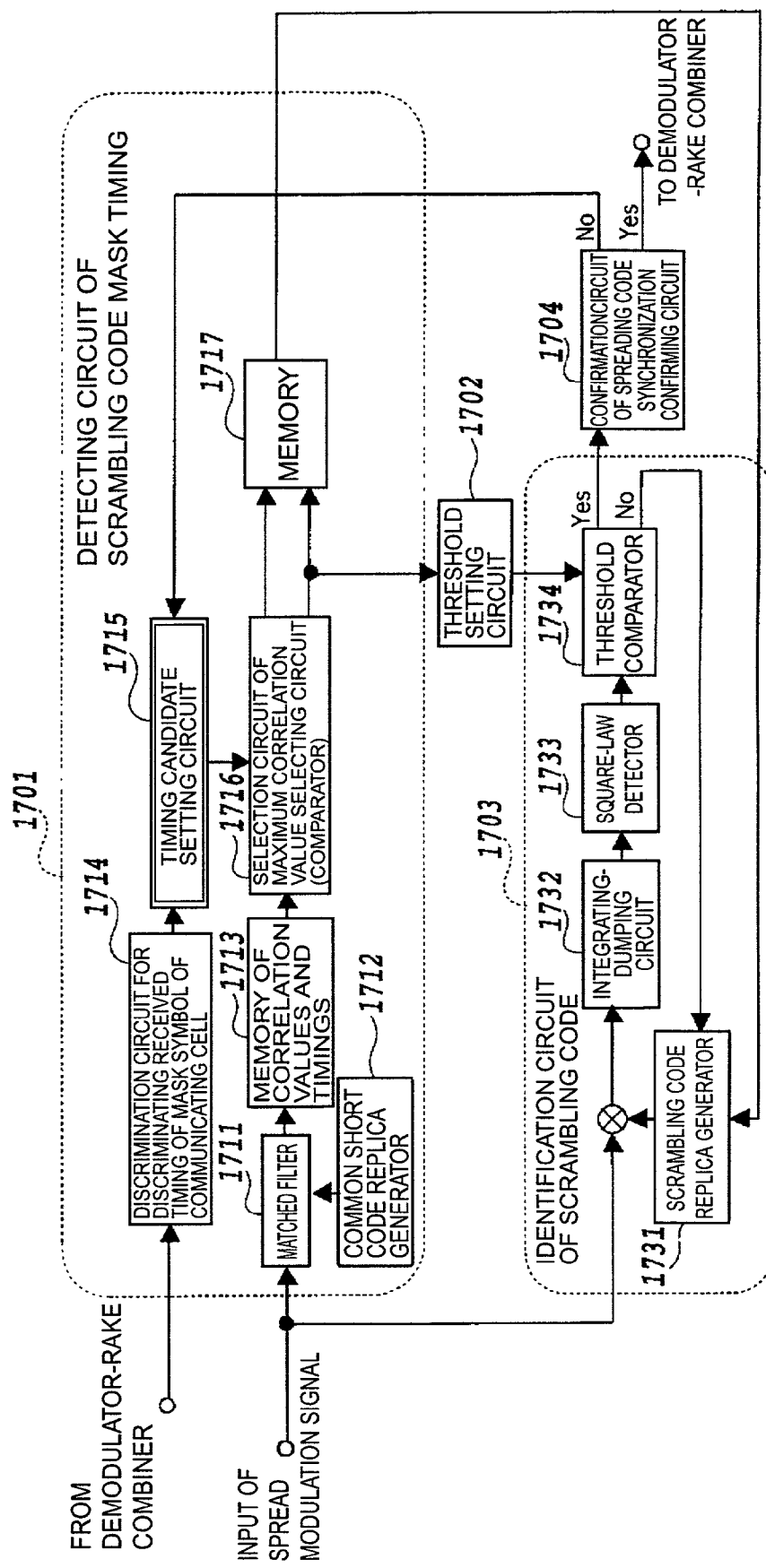
FIG. 19 is a block diagram to show a configuration of the third embodiment of the receiver for implementing the spreading code synchronization method according to the present invention.

FIG. 19 is a block diagram to show a configuration of the third embodiment of the receiver for implementing the spreading code synchronization method according to the present invention.

The receiver of the third embodiment consists of a scrambling code mask timing detection circuit 1701 for detecting the scrambling code mask timing, a threshold setting circuit 1702 for determining a threshold value corresponding to a maximum correlation value from the scrambling code mask timing detection circuit 1701, and a scrambling code identification circuit 1703 for identifying the scrambling code, based on the scrambling code mask timing from the scrambling code mask timing detection circuit 1701 and the threshold value from the threshold setting circuit 1702.

In the receiver of the third embodiment, the scrambling code mask timing detector 1701 receives the spread modulation signal and feeds it into a matched filter 1711. On the other hand, a common short code replica generator 1712 generates a spreading code replica being the short code of the scrambling code masked portions common to the base stations and feeds it into the matched filter 1711. The matched filter 1711 detects the correlation of the replica with the received spread modulation signal over N scrambling code periods and a memory 1713 stores correlation values and timings of respective peaks obtained by the correlation detection.

Receiving the information about rake finger positions of the connecting cell from the demodulator-rake combiner, a mask symbol received timing discrimination circuit 1714 discriminates the received timing of the mask symbol of the connecting cell. A timing candidate setting circuit 1715 excepts the received timing of the mask symbol fed from the mask symbol received timing discrimination circuit 1714, from candidates for the received timing of the mask symbol of the handover destination cell.

A maximum correlation output selection circuit 1716 selects a maximum correlation value and timing from the stored values in the memory 1713 at the timing set by the timing candidate setting circuit 1715, and stores them in a memory 1717. Then this memory 1717 outputs the scrambling code mask timing.

In the scrambling code identification circuit 1703, the phase of scrambling code replica generator 1731 is set to the synchronous phase obtained from the scrambling code mask timing. An integrating-dumping circuit 1732 integrates a product signal of the scrambling code from the scrambling code replica generator 1731 and the received spread modulation signal and thereafter a square-law detector 1733 performs the square-law detection of the integration result.

A comparator 1734 compares the resultant value of the square-law detection with the threshold value from the threshold setting circuit 1702 to make a judgment with the threshold value. When the result is below the threshold, the comparator 1734 outputs a judgment signal to change the scrambling code in the scrambling code replica generator 1731.

When the result exceeds the threshold on the other hand, the comparator notifies a spreading code synchronization confirmation circuit 1704 of the fact. The spreading code synchronization confirmation circuit 1704 again confirms the establishment of synchronization; when the establishment of synchronization is confirmed, the circuit 1704 notifies the known demodulator-rake combiner of the fact; on the other hand, when the establishment of synchronization is not confirmed, the circuit 1704 notifies the timing candidate setting circuit 1715 of information indicating failure in detection of the scrambling code.

At a start of spreading code synchronization, the timing candidate setting circuit 1715 sets a candidate for the scrambling code mask timing of the handover destination cell, excepting the scrambling code mask timing of the connecting cell, in the scrambling code mask timing detector 1701.

After the processes from the detection of scrambling code mask timing to the identification of scrambling code are repeated plural times and when no scrambling code is detected even after a lapse of a time preliminarily designated by the receiver, the setting of the timing candidate setting circuit 1715 is changed so as to set all the received timings as timing candidates without excepting the mask symbol received timing of the connecting cell.

Figure 20:
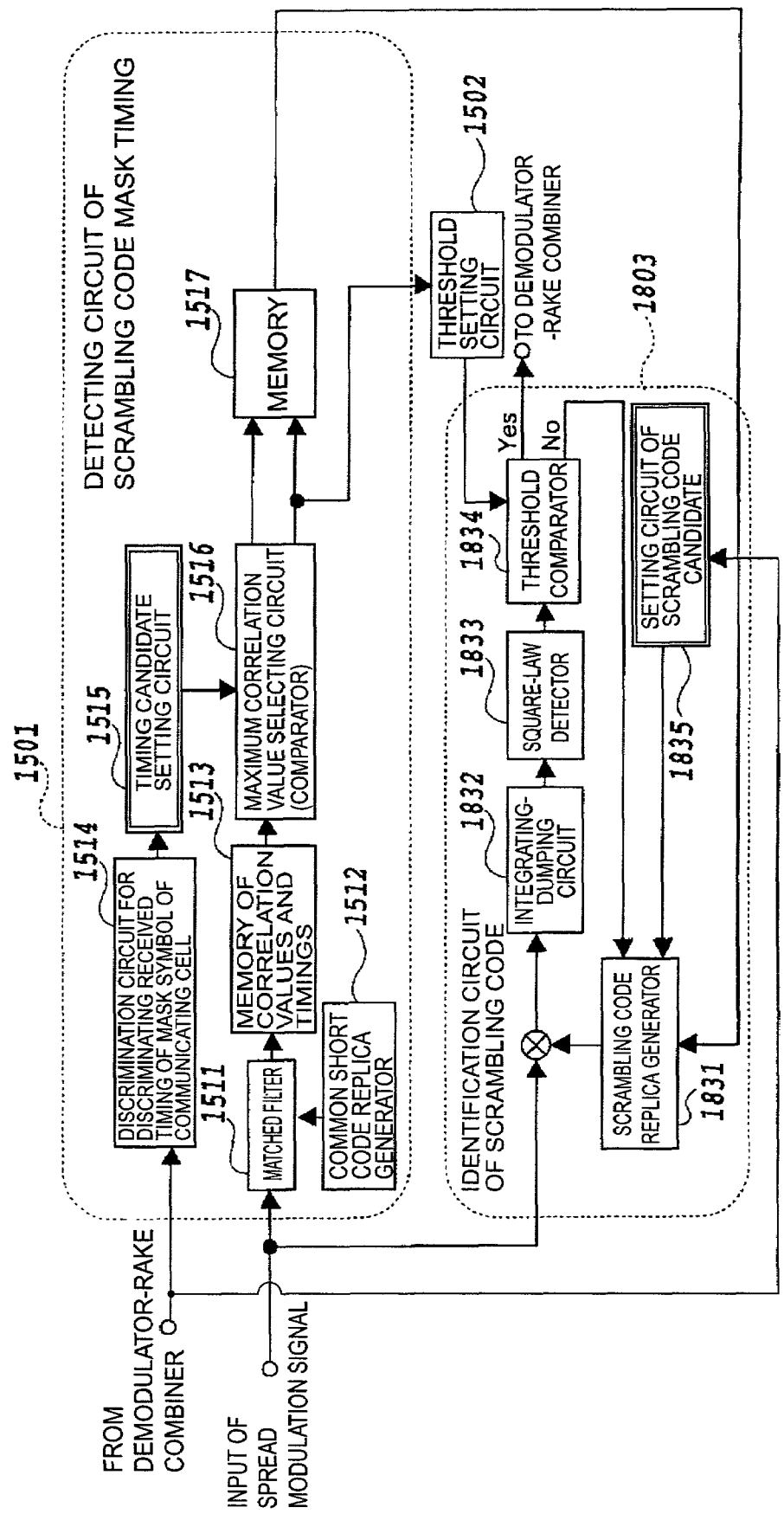
FIG. 20 is a block diagram to show a configuration of the fourth embodiment of the receiver for implementing the spreading code synchronization method according to the present invention.

FIG. 20 is a block diagram to show a configuration of the fourth embodiment of the receiver for implementing the spreading code synchronization method according to the present invention.

The receiver of the fourth embodiment consists of the scrambling code mask timing detection circuit 1501 for detecting the scrambling code mask timing, the threshold setting circuit 1502 for determining a threshold value corresponding to a maximum correlation value from the scrambling code mask timing detection circuit 1501, and a scrambling code identification circuit 1803 for identifying the scrambling code, based on the scrambling code mask timing from the scrambling code mask timing detection circuit 1501 and the threshold value from the threshold setting circuit 1502.

In the receiver of the fourth embodiment, when a scrambling code candidate setting circuit 1835 receives the indexes of scrambling codes of surrounding cells to be searched, which were received from the connecting cell and demodulated, from the demodulator-rake combiner, the scrambling code candidate setting circuit 1835 sets a scrambling code candidate and the scrambling code in a scrambling code replica generator 1831 is changed according thereto.

In the scrambling code identification circuit 1803, the phase of scrambling code replica generator 1831 is set to the synchronous phase obtained from the scrambling code mask timing. An integrating-dumping circuit 1832 integrates a product signal of the scrambling code from the scrambling code replica generator 1831 and the received spread modulation signal and thereafter a square-law detector 1833 performs the square-law detection of the integration result.

A comparator 1834 compares the resultant value of the square-law detection with the threshold value from the threshold setting circuit 1502 to make a judgment with the threshold value. When the result exceeds the threshold value, the comparator 1834 judges that synchronization is established, and then notifies the known demodulator-rake combiner of the judgment. When the result is below the threshold value, the comparator 1834 outputs a judgment signal to change the scrambling code in the scrambling code replica generator 1831.

Figure 21:
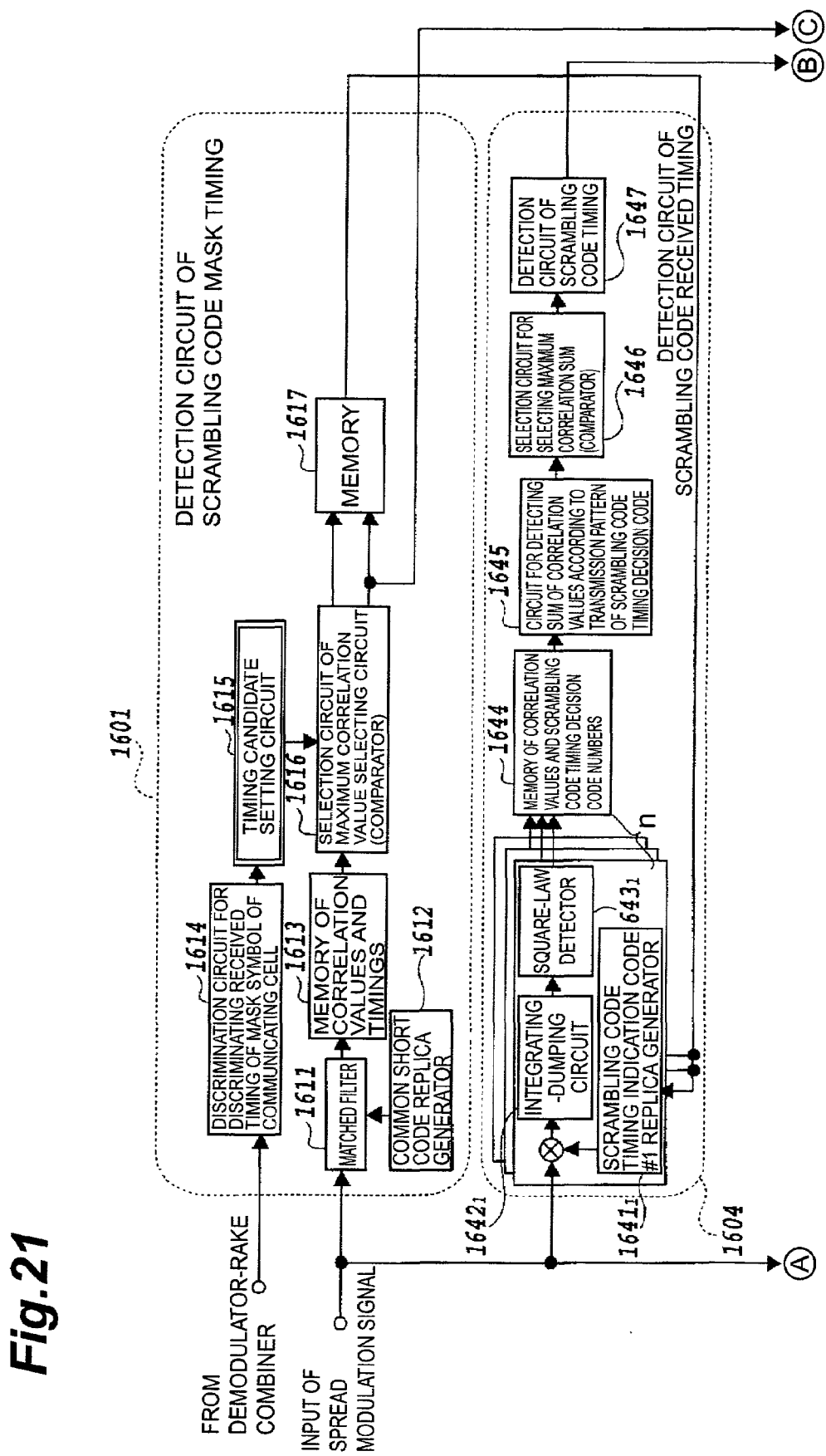
FIG. 21 is a block diagram to show a configuration of part of the fifth embodiment of the receiver (a scrambling code mask timing detection circuit and a scrambling code received timing detection circuit) for implementing the spreading code synchronization method according to the present invention.
Figure 22:
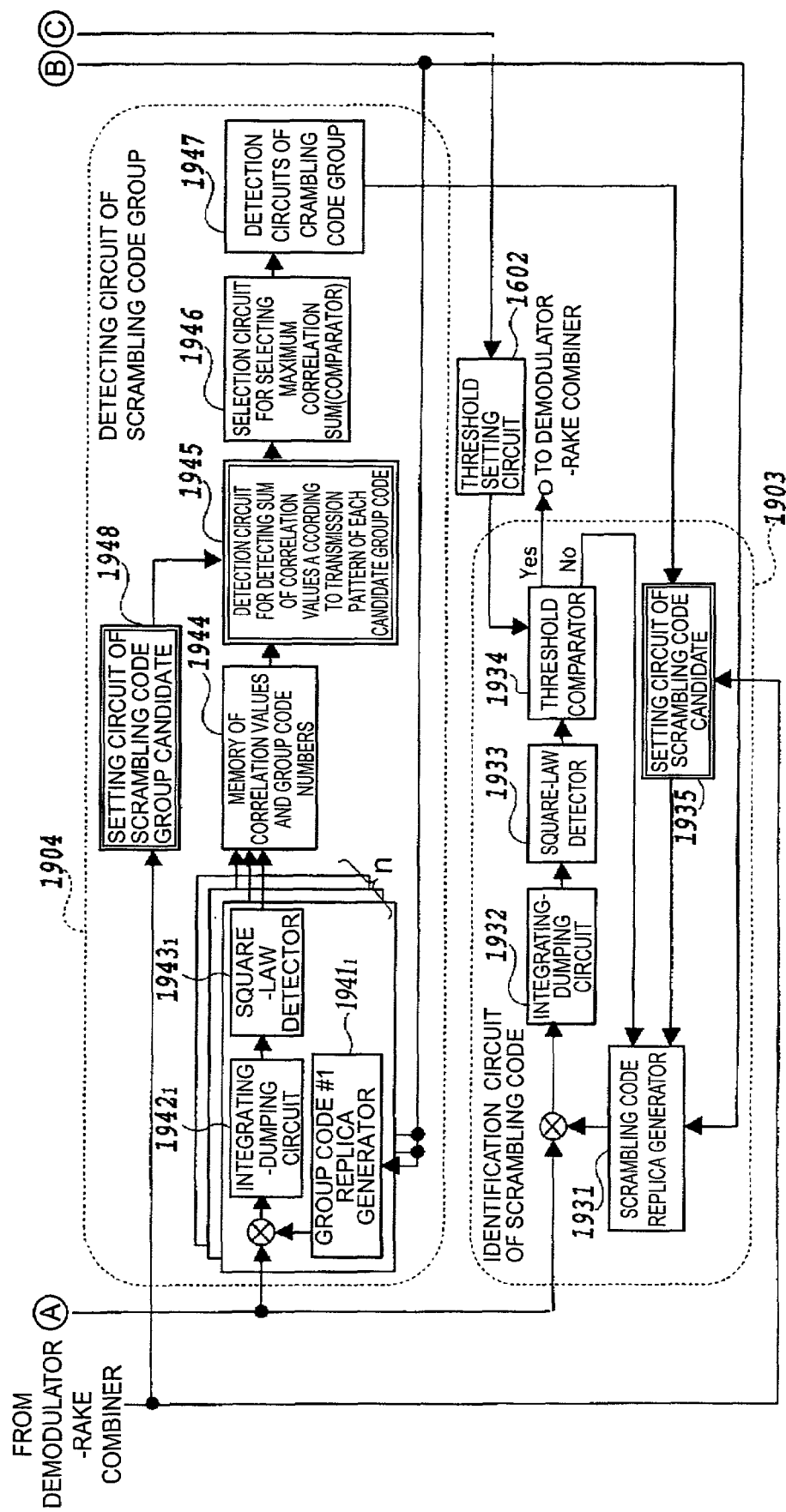
FIG. 22 is a block diagram to show a configuration of part of the fifth embodiment of the receiver (a scrambling code group detection circuit and a scrambling code identification circuit) for implementing the spreading code synchronization method according to the present invention.

Further, FIG. 21 is a block diagram to show part of a configuration of the fifth embodiment of the receiver for implementing the spreading code synchronization method according to the present invention (a scrambling code mask timing detection circuit and a scrambling code received timing detection circuit). FIG. 22 is a block diagram to show part of the configuration of the fifth embodiment of the receiver for implementing the spreading code synchronization method according to the present invention (a scrambling code group detection circuit and a scrambling code identification circuit).

The receiver of the fifth embodiment consists of the scrambling code mask timing detection circuit 1601 for detecting the scrambling code mask timing, the threshold setting circuit 1602 for determining a threshold corresponding to a maximum correlation value from the scrambling code mask timing detection circuit 1601, the scrambling code received timing detection circuit 1604 for generating the received timing of the scrambling code from the scrambling code mask timing fed from the scrambling code mask timing detection circuit 1601, a scrambling code group detection circuit 1904 for detecting a scrambling code group, and a scrambling code identification circuit 1903 for identifying the scrambling code, based on the received timing of the scrambling code from the scrambling code received timing detection circuit 1604, the threshold value from the threshold setting circuit 1602, and the scrambling code group from the scrambling code group detection circuit 1904.

In the scrambling code group detection circuit 1904 in the receiver of the fifth embodiment, a scrambling code group candidate setting circuit 1948 receives the indexes of scrambling codes of surrounding cells to be searched, which were received from the connecting cell and demodulated, from the demodulator-rake combiner. The scrambling code group candidate setting circuit 1948 sets as group candidates only the groups to which the input scrambling codes of the surrounding cells belong. Based on the scrambling code received timing detected by the scrambling code received timing detection circuit 1604, group code replica generators $1941_1$ to $1941_n$ generate respective group code replicas, integrating-dumping circuits $1941_1$ to $1942_n$ integrate product signals of the respective group code replicas and the received spread modulation signal each over one symbol period, and thereafter square-law detectors $1943_1$ to $1943_n$ perform the square-law detection of the integration results.

A memory 1944 stores the results of the square-law detection of the correlation integration values for the respective group codes. This operation is carried out for received signals spread by a plurality of group codes and the results are stored in the memory 1944. After completion of the correlation detection, a detection circuit 1945 calculates a sum of correlation values according to the transmission pattern of each group code candidate, using the results of the square-law detection of the correlation integration values in the number equal to the number of group codes×the number of correlation detections, obtained from the memory 1944.

A selection circuit 1946 compares the resultant sums of correlation values in the number of transmission patterns of group code candidates, selects a pattern yielding a maximum correlation value sum, and outputs it. A scrambling code group detection circuit 1947 receives the pattern fed from the selection circuit 1946 and detects the scrambling code group including the scrambling code spreading the received spread modulation signal.

In the scrambling code identification circuit 1903, a scrambling code candidate setting circuit 1935 receives the indexes of scrambling codes of surrounding cells to be searched, which were received from the connecting cell and demodulated, from the demodulator-rake combiner. The scrambling code candidate setting circuit 1935 sets as scrambling code candidates only the scrambling codes included in the scrambling code group detected by the scrambling code group detection circuit 1904, out of the input scrambling codes.

The identification of scrambling code is carried out for the scrambling code candidates set in the scrambling code candidate setting circuit 1935. The phase of scrambling code replica generator 1931 is set to the synchronous phase obtained from the received timing of the scrambling code. An integrating-dumping circuit 1932 integrates a product signal of the scrambling code from the scrambling code replica generator 1931 and the received spread modulation signal and thereafter a square-law detector 1933 performs the square-law detection of the integration result.

A comparator 1934 compares the resultant value of the square-law detection with the threshold value from the threshold setting circuit 1602 to make a judgment with the threshold value. When the result of the square-law detection exceeds the threshold value, the comparator 1934 judges that synchronization is established and notifies the known demodulator-rake combiner of the judgment. When the result is below the threshold value, the comparator 1934 outputs a judgment signal to change the scrambling code in the scrambling code replica generator 1931.

Figure 23:
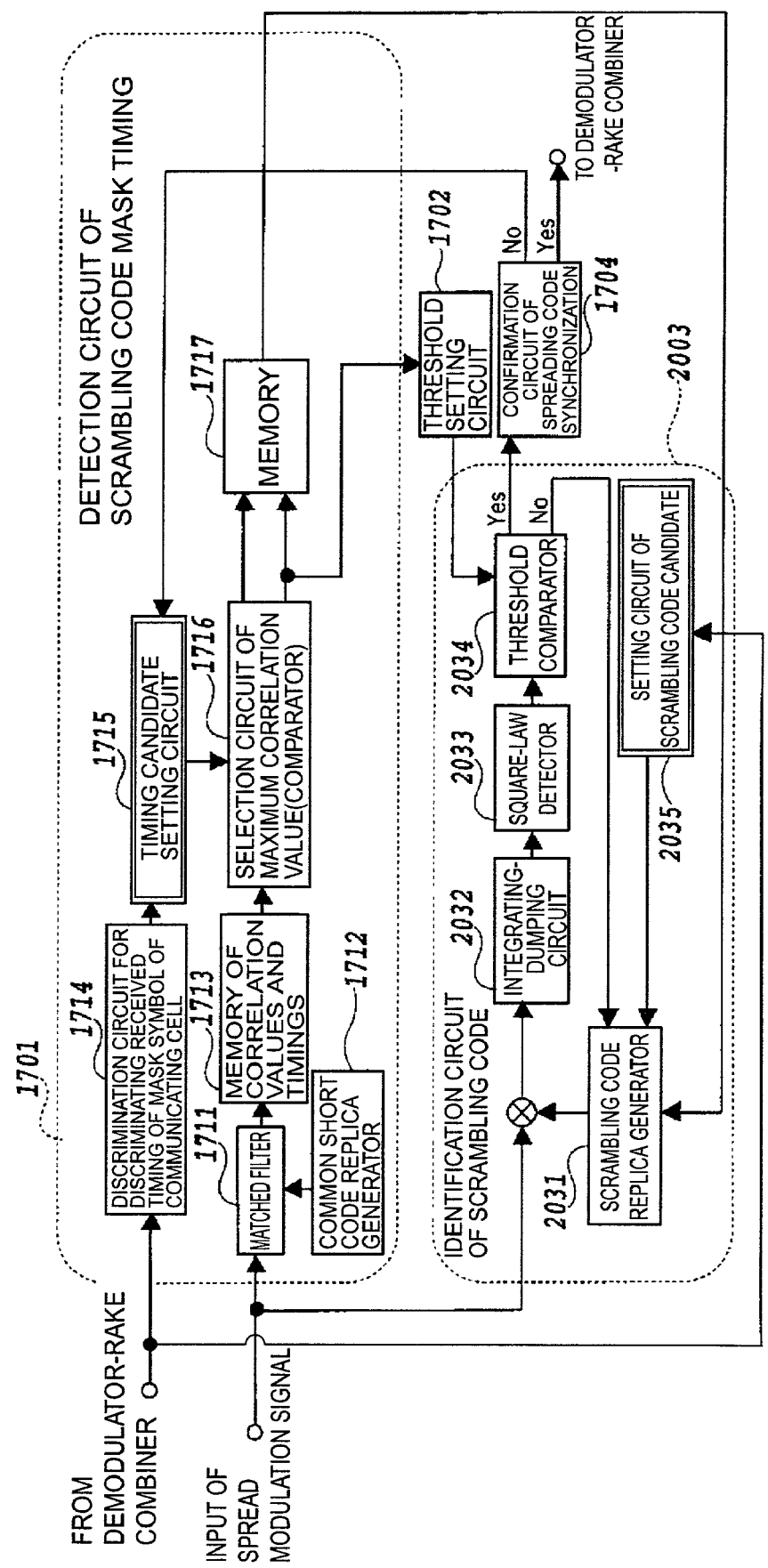
FIG. 23 is a block diagram to show a configuration of the sixth embodiment of the receiver for implementing the spreading code synchronization method according to the present invention.

FIG. 23 is a block diagram to show a configuration of the sixth embodiment of the receiver for implementing the spreading code synchronization method according to the present invention.

The receiver of the sixth embodiment consists of the scrambling code mask timing detection circuit 1701 for detecting the scrambling code mask timing, the threshold setting circuit 1702 for determining a threshold value corresponding to a maximum correlation value from the scrambling code mask timing detection circuit 1701, and a scrambling code identification circuit 2003 for identifying the scrambling code, based on the scrambling code mask timing from the scrambling code mask timing detection circuit 1701 and the threshold value from the threshold setting circuit 1702.

In the receiver of the sixth embodiment, a scrambling code candidate setting circuit 2035 receives the indexes of scrambling codes of surrounding cells to be searched, which were received from the connecting cell and demodulated, from the demodulator-rake combiner. The scrambling code in scrambling code replica generator 2031 is changed according to a scrambling code candidate set by the scrambling code candidate setting circuit 2035.

In the scrambling code identification circuit 2003, the phase of the scrambling code replica generator 2031 is set to the synchronous phase obtained from the scrambling code mask timing. An integrating-dumping circuit 2032 integrates a product signal of the scrambling code from the scrambling code replica generator 2031 and the received spread modulation signal and thereafter a square-law detector 2033 performs the square-law detection of the integration result. A comparator 2034 compares the resultant value of the square-law detection with the threshold value from the threshold setting circuit 1702 to make a judgment with the threshold value. When the result is below the threshold value, the comparator 2034 outputs a judgment signal to change the scrambling code in the scrambling code replica generator 2031.

When the result exceeds the threshold value on the other hand, the comparator 2034 notifies the spreading code synchronization confirmation circuit 1704 of that fact. The spreading code synchronization confirmation circuit 1704 again confirms the establishment of synchronization. When the establishment of synchronization is confirmed, the confirmation circuit 1704 notifies the known demodulator-rake combiner of that fact. When the establishment of synchronization is not confirmed, the confirmation circuit 1704 notifies the timing candidate setting circuit 1715 of information indicating failure in detection of the scrambling code.

At a start of the spreading code synchronization, the timing candidate setting circuit 1715 sets candidates for the scrambling code mask timing of the handover destination cell, excepting the scrambling code mask timing of the connecting cell in the scrambling code mask timing detection circuit 1701.

After the processes from the detection of scrambling code mask timing to the identification of scrambling code are repeated plural times and when no scrambling code is detected even after a lapse of a time preliminarily designated by the receiver, the setting of the timing candidate setting circuit 1715 is changed so as to use all the timings as timing candidates without excepting the received timing of the mask symbol of the connecting cell.

Figure 24:
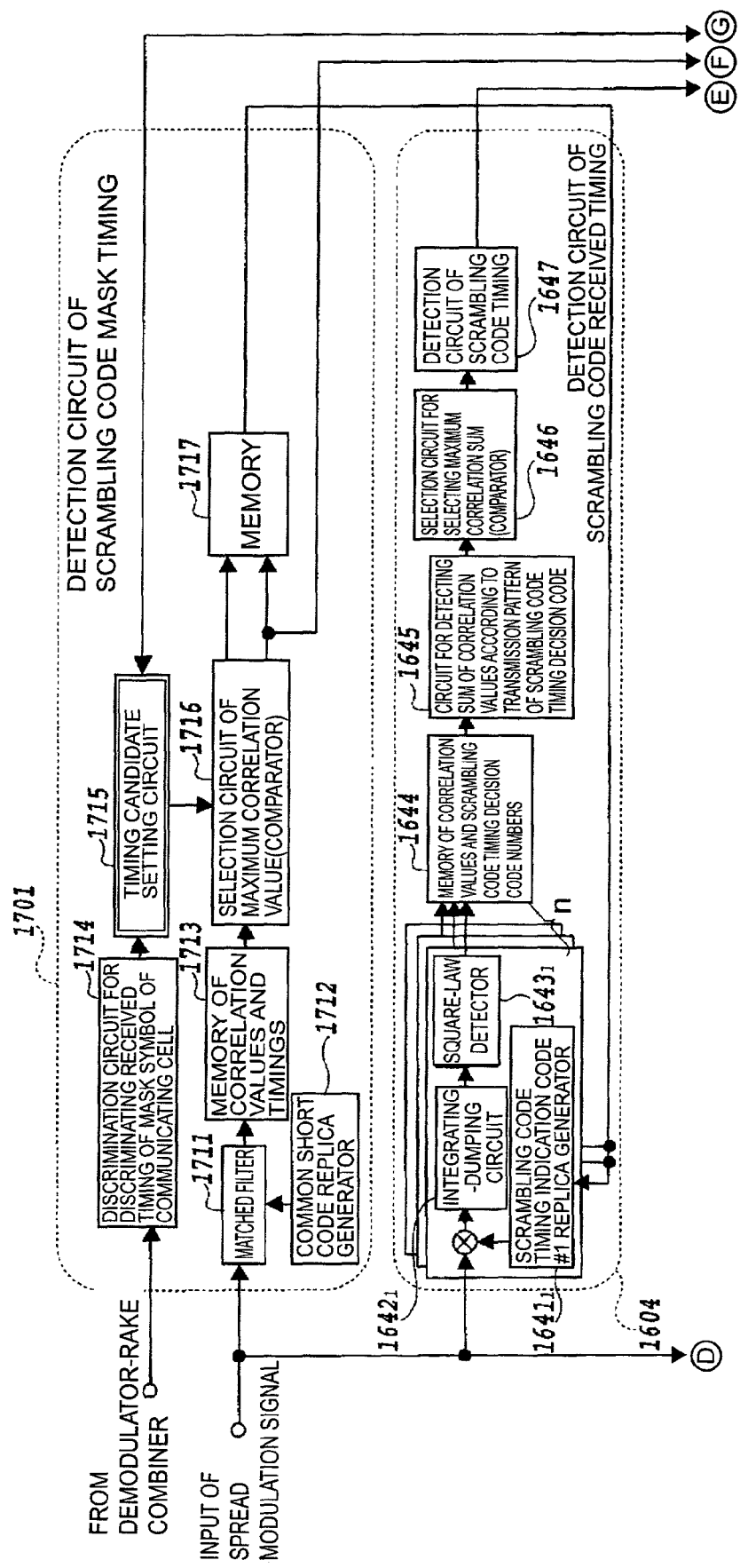
FIG. 24 is a block diagram to show a configuration of part of the seventh embodiment of the receiver (a scrambling code mask timing detection circuit and a scrambling code received timing detection circuit) for implementing the spreading code synchronization method according to the present invention.
Figure 25:
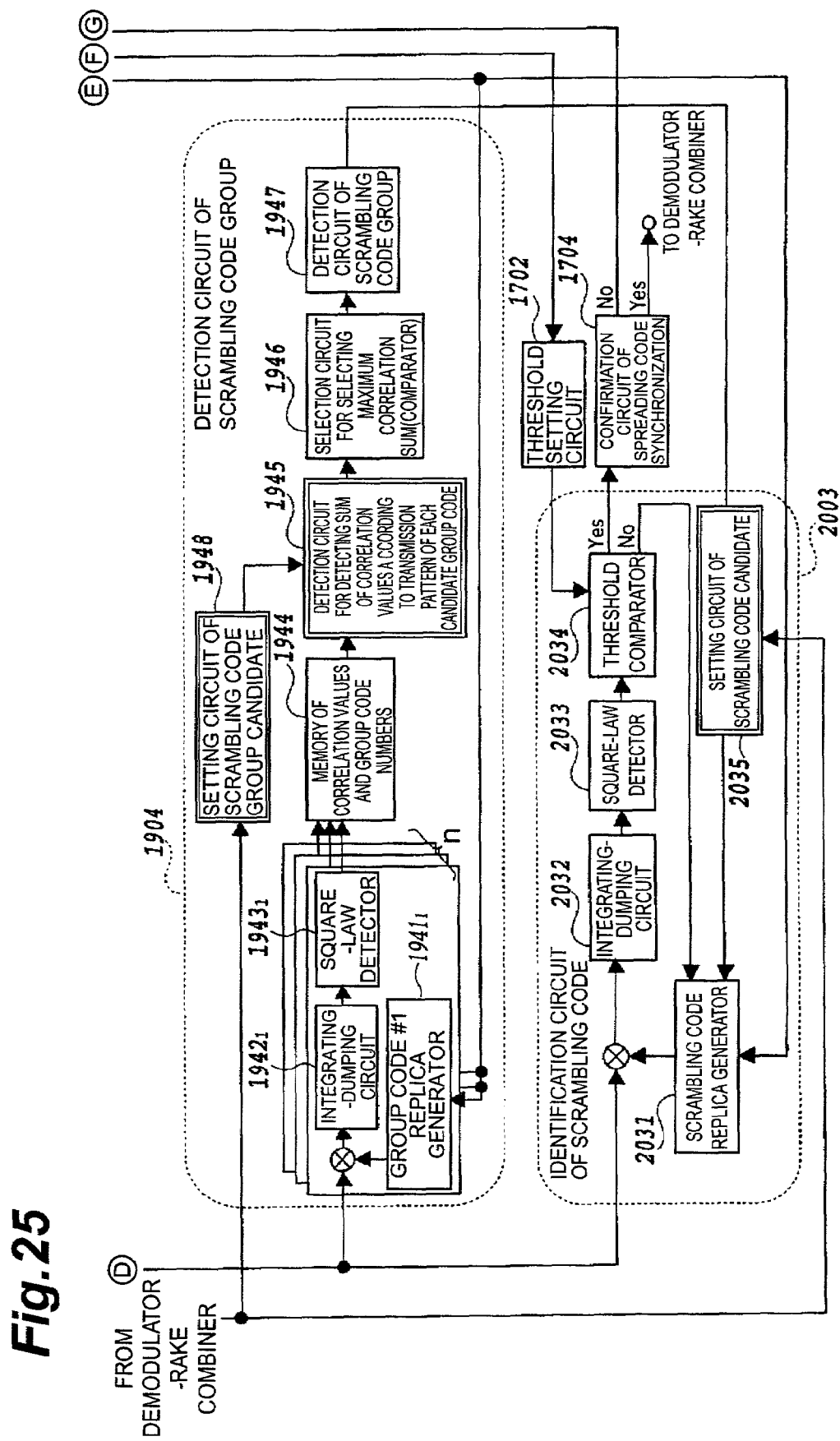
FIG. 25 is a block diagram to show a configuration of part of the seventh embodiment of the receiver (a scrambling code group detection circuit and a scrambling code identification circuit) for implementing the spreading code synchronization method according to the present invention.

FIG. 24 is a block diagram to show part of a configuration of the seventh embodiment of the receiver for implementing the spreading code synchronization method according to the present invention (a scrambling code mask timing detection circuit and a scrambling code received timing detection circuit). FIG. 25 is a block diagram to show part of the configuration of the seventh embodiment of the receiver for implementing the spreading code synchronization method according to the present invention (a scrambling code group detection circuit and a scrambling code identification circuit).

The receiver of the seventh embodiment consists of the scrambling code mask timing detection circuit 1701 for detecting the scrambling code mask timing, the threshold setting circuit 1702 for determining a threshold value corresponding to a maximum correlation value from the scrambling code mask timing detection circuit 1701, the scrambling code received timing detection circuit 1604 for generating the received timing of the scrambling code from the scrambling code mask timing fed from the scrambling code mask timing detection circuit 1701, the scrambling code group detection circuit 1904 for detecting a scrambling code group, and the scrambling code identification circuit 2003 for identifying the scrambling code, based on the received timing of the scrambling code from the scrambling code received timing detection circuit 1604, the threshold value from the threshold setting circuit 1702, and the scrambling code group from the scrambling code group detection circuit 1904.

In the receiver of the seventh embodiment, the scrambling code mask timing circuit 1701, the scrambling code received timing detection circuit 1604, the scrambling code group detection circuit 1904, and the scrambling code identification circuit 2003 perform the series of operations, as described above, and the operations after the judgment with the threshold in the scrambling code identification circuit 2003 are substantially the same as those in the receiver of the sixth embodiment shown in FIG. 23.

As described above, the present invention enables the cell search to be performed faster and more accurately where the initial acquisition method to mask the scrambling codes is applied to the surrounding cell search on the occasion of entry of the mobile station into the soft handover mode in the intercell asynchronous system.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A spreading code synchronization method in a mobile communication system where, during handover of a mobile station from a first base station in communications with a second base station expected to initiate new communications, synchronous detection is carried out to detect a first spreading code assigned to the second base station, out of received signal which are received ach by the mobile station and each of which comprises an information data symbol spread by a combination of said first spreading code and a second spreading code, and a mask symbol spread by only the second spreading code, said spreading code synchronization method comprising:

a first step of detecting a received timing of a mask symbol of said second base station in a state in which a received timing of said mask symbol from said first base station is excepted from candidates of received timings for said synchronous detection; and a second step of carrying out the synchronous detection of the first spreading code assigned to the second base station, wherein after said first and second steps are repeated at least either for a predetermined time or a predetermined number of times and when the received timing of the mask symbol of the second base station is not detected, the detection of the received timing of the mask symbol of said second base station is carried out using received timings of all scrambling codes as candidates without exception.

2. A spreading code synchronization method according to claim 1, wherein in said second step the synchronous detection is carried out using as candidates only first spreading codes which are an arbitrary number of first spreading codes informed of by said first base station and which are assigned to base stations located around the first base station.

3. A spreading code synchronization method according to claim 2, wherein after said first and second steps are repeated at least either for a predetermined time or a predetermined number of times and when the received timing of the mask symbol of the second base station is not detected, the detection of the received timing of the mask symbol of said second base station is carried out using received timings of all scrambling codes as candidates without exception.

4. A spreading code synchronization method according to claim 1, further comprising a third step executed between said first and second steps, said third step being a step of detecting a first spreading code group, using as candidates only groups including first spreading codes which are an arbitrary number of first spreading codes informed of by said first base station and which are assigned to base stations located around the first base station;

wherein in said second step the synchronous detection is carried out using as candidates only said arbitrary number of first spreading codes informed of by the first base station, out of first spreading codes included in the first spreading code group detected in said third step.

5. A spreading code synchronization method according to claim 4, wherein after said first to third steps are repeated at least either for a predetermined time or a predetermined number of times and when the received timing of the mask symbol of the second base station is not detected, the detection of the received timing of the mask symbol of said second base station is carried out using received timings of all scrambling codes as candidates without exception.

6. A receiver in a mobile communication system where, during handover from a first base station in communications with a second base station expected to initiate new communications, synchronous detection is carried out to detect a first spreading code assigned to the second base station, out of received signals which are received each by the apparatus and each of which comprises an information data symbol spread by a combination of said first spreading code and a second spreading code, and a mask symbol spread by only the second spreading code, said receiver comprising:

first means for detecting a received timing of a mask symbol of said second base station in a state in which a received timing of said mask symbol from said first base station is excepted from candidates of received timings for the synchronous detection; and second means for carrying out the synchronous detection of said first spreading code assigned to said second base station, wherein after the synchronous detection of said first spreading code by said first and second means is repeated at least either for a predetermined time or a predetermined number of times and when the received timing of the mask symbol of said second base station is not detected, the detection of the received timing of the mask symbol of said second base station is carried out using received timings of all scrambling codes as candidates without exception.

7. A receiver according to claim 6, wherein said second means performs the synchronous detection, using as candidates only first spreading codes which are an arbitrary number of first spreading codes informed of by said first base station and which are assigned to base stations located around the first base station.

8. A receiver according to claim 7, wherein after the synchronous detection of said first spreading code by said first and second means is repeated at least either for a predetermined time or a predetermined number of times and when the received timing of the mask symbol of said second base station is not detected, the detection of the received timing of the mask symbol of said second base station is carried out using received timings of all scrambling codes as candidates without exception.

9. A receiver according to claim 6, further comprising third means for detecting a first spreading code group, using as candidates only groups including first spreading codes which are an arbitrary number of first spreading codes informed of by said first base station and which are assigned to base stations located around the first base station;

wherein said second means carries out the synchronous detection, using as candidates only the arbitrary number of first spreading codes informed of by said first base station, out of first spreading codes included in the first spreading code group detected by said third means.

10. A receiver according to claim 9, wherein after the synchronous detection of said first spreading code by said first and second means is repeated at least either for a predetermined time or a predetermined number of times and when the received timing of the mask symbol of said second base station is not detected, the detection of the received timing of the mask symbol of said second base station is carried out using received timings of all scrambling codes as candidates without exception.

11. A mobile station comprising the receiver according to claim 6.

* * * * *